United States Patent [19]

Kawafuji et al.

[11] Patent Number: 5,035,539
[45] Date of Patent: Jul. 30, 1991

[54] LINER FOR PIPELINE REPAIR AND METHOD FOR REPAIRING PIPELINES

[75] Inventors: Takayuki Kawafuji, Tokyo; Toshio Akesaka, Yokohama; Sinkiti Ooka, Tokyo, all of Japan

[73] Assignees: Toa Grout Kogyo Kabushiki Kaishi; Kabushiki Kaisha Iseki, both of Tokyo, Japan

[21] Appl. No.: 566,752

[22] Filed: Aug. 13, 1990

[30] Foreign Application Priority Data

Aug. 14, 1989 [JP] Japan .................................. 1-207839
Dec. 4, 1989 [JP] Japan .................................. 1-313404
Mar. 15, 1990 [JP] Japan .................................. 2-64633

[51] Int. Cl.⁵ .......................................... F16L 1/025
[52] U.S. Cl. ................................... 405/154; 138/97; 405/150
[58] Field of Search ............... 405/150, 154, 156, 157, 405/184; 138/97, 98, 140, 147, 151

[56] References Cited

U.S. PATENT DOCUMENTS

| | | | |
|---|---|---|---|
| 4,257,459 | 3/1981 | Jenks | 138/147 |
| 4,347,018 | 8/1982 | Wrightson | 405/150 |
| 4,371,288 | 2/1983 | Broca et al. | 405/150 X |
| 4,379,654 | 4/1983 | Rovelli | 405/150 X |
| 4,610,120 | 9/1986 | Canavesi et al. | 405/150 X |
| 4,770,562 | 9/1988 | Muller et al. | 405/154 |

Primary Examiner—David H. Corbin
Attorney, Agent, or Firm—Stoel Rives Boley Jones & Grey

[57] ABSTRACT

A liner for pipeline repair is provided that includes an elastically deformable sleeve having impermeability, a base having a sheet-like base portion disposed inside the sleeve, wound into a cylindrical form, and expandable radially and fixing means disposed in the base for maintaining the base portion in a subtantially cylindrical form when the base portion is expanded radially within the sleeve. The liner is used for preventing the outflow of water from a pipeline such as a sewer pipe and/or the inflow of water into the pipeline.

19 Claims, 21 Drawing Sheets

LINER FOR PIPELINE REPAIR AND METHOD FOR REPAIRING PIPELINES

BACKGROUND OF THE INVENTION

1. Field of the Invention

This invention relates to a liner utilized for preventing the outflow of water from a pipeline such as a sewer pipe and preventing the inflow of water into the pipeline, and a method for repairing the pipeline to prevent water leakage into and from the pipeline by using the liner.

2. Description of the Prior Art

As one of the prior art methods for repairing pipelines such as sewer pipes, water supply pipes, conduit tubes or the like, Japanese Utility Model Publication No. 62-18799 discloses disposing a liner having a rubber sleeve and a coil spring located within the sleeve such that the sleeve is pressed by the coil spring against the inner surface of the pipe defining a pipeline. However, in this method, the portions of the sleeve, which do not contact with the coil spring, are easily deformed by a force, such as ground water pressure, directed from the outside of the sleeve inward, so that ground water easily flows into the pipeline. To prevent this, the sleeve has to be thickened to improve its mechanical strength.

As one of the repair methods for preventing gas leakage from gas pipes, Japanese Utility Model Public Disclosure (KOKAI) No. 60-24993 discloses a method for disposing a liner having a rubber sleeve and an expandable band located inside the respective ends of the sleeve such that each end of the sleeve is pressed by the band against the inner surface of the pipe defining a pipeline. However, in this method, the axial center portion of the sleeve is also easily deformed by a force directed from the outside of the sleeve inward. Therefore, the mechanical strength of the axial center of the sleeve has to be improved to reinforce the mechanical strength thereof.

In order to solve these problems, the present inventors have proposed a method for preventing water leakage by use of a liner including a sheet-like base having a pair of overlapped portions into a spiral form to place one of the overlapped portions inside the other, and sheet-like rubber cut-off members disposed on the circumferential surface of the base.

In this method, the liner in its shrunken state is moved to the portion to be repaired within a pipe, and is then expanded, so that the liner is disposed to cover the inner surface of the pipe. When the liner is disposed at the pipe portion to be repaired, the cut-off members are pressed against the inner pipe surface by the base to prevent water leakage, and the base maintains the sleeve pressed against the inner surface of the pipe.

However, in the liner used in the above-described water leakage-prevention method, the cut-off members are butted in portions corresponding to the overlapped portions of the base. Consequently, leakage of water from the butted portion of the cut-off members and the overlapped portions of the base is not prevented.

SUMMARY OF THE INVENTION

It is, accordingly, an object of the present invention to provide a liner for repairing a pipeline, wherein the liner has high leakage-prevention capability without improvement of the mechanical strength of a sleeve, and a method for repairing a pipeline by utilizing the liner.

A liner of the present invention for repairing a pipeline is disposed on the inner surface of a pipe defining the pipeline and comprises an elastically deformable sleeve having impermeability; a base having a sheet-like base portion disposed inside the sleeve in a radially expandable, wound cylindrical form; and fixing means disposed at the base for maintaining the base portion in a substantially cylindrical form when the base portion is expanded radially within the sleeve.

The liner is moved to a predetermined portion within a pipeline having a larger inner diameter than the outer diameter of the sleeve. Then, the base portion is expanded into a cylindrical form until the sleeve is elastically deformed by being pressed against the inner surface of the pipe. The base is maintained by the fixing means in a radially expanded condition in order to maintain the sleeve in a deformed condition. Thus, sleeve is placed between the base portion and the inner surface of the pipe, and the liner is attached on the inner surface of the pipe.

According to the liner of the present invention, water leakage is surely prevented, since a sleeve without an butting portion is used.

It is preferable that the base portion have an axial length substantially equal to the axial length of the sleeve. Thus, the sleeve is supported by the base portion over almost the whole axial length, so that it is not necessary to increase the mechanical strength of the sleeve.

It is also preferable that the sleeve have an elastically deformable cylindrical portion and a plurality of elastically deformable projections formed at axial intervals on the circumferential surface of the cylindrical portion and successively extending in the circumferential direction. Thus, when the base portion is expanded, the projections are mainly deformed by being pressed against the inner surface of the pipe, so that the projections are forced to contact the inner surface of the pipe by their own restoring force, thereby preventing the leakage of water. As a result, the thickness of the sleeve may be decreased.

The sleeve has an elastically deformable cylindrical portion, and at least three elastically deformable projections formed at respective ends of the cylindrical portion at axial intervals, each projection successively extending along the circumference of the corresponding end of the cylindrical portion in the circumferential direction. In this case, each projection at an intermediate axial position preferably consists of a polymeric material which expands by absorbing water, and the base portion preferably has a longer axial length than the distance between the outside ends of the projections positioned axially endmost. Thus, when the intermediate projection absorbs water and expands, the projection at both ends of the sleeve prevent the intermediate projection from expanding in the axial direction of the liner as a whole. As a result, the intermediate projection is expanded outward in the radial direction of the liner and is more strongly pressed against the inner surface of the pipe, so that the cut-off performance of the liner is improved.

If the intermediate projection has a structure that is restrained from expanding in the axial direction of the sleeve, the intermediate projection mainly expands in the radial direction of the liner, and as a result, the intermediate projection is pressed more firmly against the inner surface of the pipe.

It is also preferable that each projection be formed such that the thickness of the projection in the axial direction of the sleeve is gradually decreased from the portion adjacent the cylindrical portion outward in the radial direction of the sleeve. Thus, when the liner is attached to the pipe, the projections are bent. Therefore, the projections are surely pressed against the inner surface of the pipe, even if the pipe has a slightly irregular inner surface.

It is preferable that the height of the intermediate projection made of a polymeric material which expands by absorbing water be larger than those of other projections. In this manner, the intermediate projection is more deformable than the other ones and is largely deformed when the sleeve is pressed against the inner surface of the pipe. As a result, when the base portion is substantially expanded in a cylindrical form, a decrease in the diameter of the base portion, if any, is absorbed mainly by a slight recovery of the intermediate projection.

It is also preferable that the fixing means include a first engaging portion disposed in the base portion and a plurality of second engaging portions disposed the base portion and at angular intervals from each other and from the first engaging portion. In this case, the first engaging portion is selectively engaged with a second engaging portion to maintain the expanded base portion in a substantially cylindrical form. In this way, as the first portion is engaged with one of the second portions, the liner is pressed against the inner surface of the pipe, even though there is an error in the inner diameter of the portion for disposing the liner. As a result, the object can be surely held within the pipe, even though there are some errors in the inner diameter of the pipe, since the first engaging portion can be engaged with any one of the second engaging portions.

The following can be first and second engaging portions: Z-like metal fittings attached to the base portion, one edge of the base portion, a hole formed in the base portion, a tongue embossed from one side in the thickness direction of the base portion to the other, a projection formed at another portion of the base portion, and a bent portion obtained by bending one end of the base portion.

The base can further have a pair of belt-like extension portions, extending in a mutually parallel relationship separated by an interval in the axial direction of the base from one edge of the base portion. In this case, one of the first and second engaging portions includes a pair of elongate notches extending in the axial direction and formed at an interval in the axial direction on the side of the base portion opposite to the extension portion of the base portion, the notch receiving the extension portion, and the other of the first and second engaging portions includes saw-like teeth formed at the respective extension portions to engage with the portion defining the notch of the base portion.

It is preferable that the base further includes deformation portion that is deformed radially outward at the respective edges in the axial direction of the base portion. Thus, when the base portion is expanded, both edges of the base portion are prevented from relatively displacing in the axial direction by the deformation portion. Therefore, the base portion is correctly expanded, and the liner is maintained in a correct condition within the pipe.

It is preferable that the deformation portion successively extend from the one end portion to the other end portion of the base portion. Thus, the deformation portion acts similarly to a rib, and the mechanical strength against a force acting to crush the liner is improved.

It is preferable that the sleeve be arranged around the base portions and between the deformation portions. Thus, the sleeve is prevented from displacing relative to a holder in the axial direction of the sleeve by the deformation portion. As a result, the base portion is correctly expanded, the liner is maintained in a more accurate condition, and the sleeve is maintained in a more accurate condition.

It is preferable that the base has its own identification code attached at the inside thereof. While a truck carrying a television camera moves through the existing pipeline for monitoring the inside thereof, the repaired portions are confirmed by the monitored code number for the liner displayed by the monitor. Therefore, the repaired portions can be easily and surely confirmed.

As for the code, use is made of figures, bar code, alphabet, Chinese characters, hiragana, katakana, pictures, or the like.

When codes have already been attached to the existing pipeline or the liner of the present invention have already been placed in the existing pipeline, a code different from those previously used in the existing pipeline can be attached on a liner to be newly disposed.

In the method of the present invention for repairing pipelines, a liner is used as a cut-off means. The liner includes an elastically deformable sleeve having a smaller outer diameter than the inner diameter of a pipe defining the pipeline and exhibiting impermeability; a base having a sheet-like base portion disposed inside the sleeve in a radially expandable, wound cylindrical form and having an axial length substantially equal to the axial length of the sleeve; and fixing means arranged at the base for maintaining the base portion in a substantially cylindrical form when the base portion is expanded radially within the sleeve.

The method for repairing pipelines according to the present invention comprises the steps of disposing the liner at a predetermined place within the pipeline; radially expanding the base to deform the sleeve until the sleeve is pressed against the inner surface of the pipe; and maintaining the base in a radially expanded condition through the fixing means to maintain the sleeve in its elastically deformed condition.

It is preferable to form an annular recess at a predetermined position within the pipe for receiving the liner prior to disposition of the liner at that predetermined position. Thus, liner is disposed without projecting from the inner surface of the pipe.

It is further preferable to use the liner with an identification code attached on the base, and to place the liner such that the code is positioned inside and ascertainable by a camera passing through the pipe.

Thus, the repaired portions are confirmed by these codes on the liner displayed by a monitor, when a truck carrying a television camera is moved through existing pipelines. As a result, the repaired portions can be easily and surely confirmed.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF PREFERRED EMBODIMENTS

Figure 1:
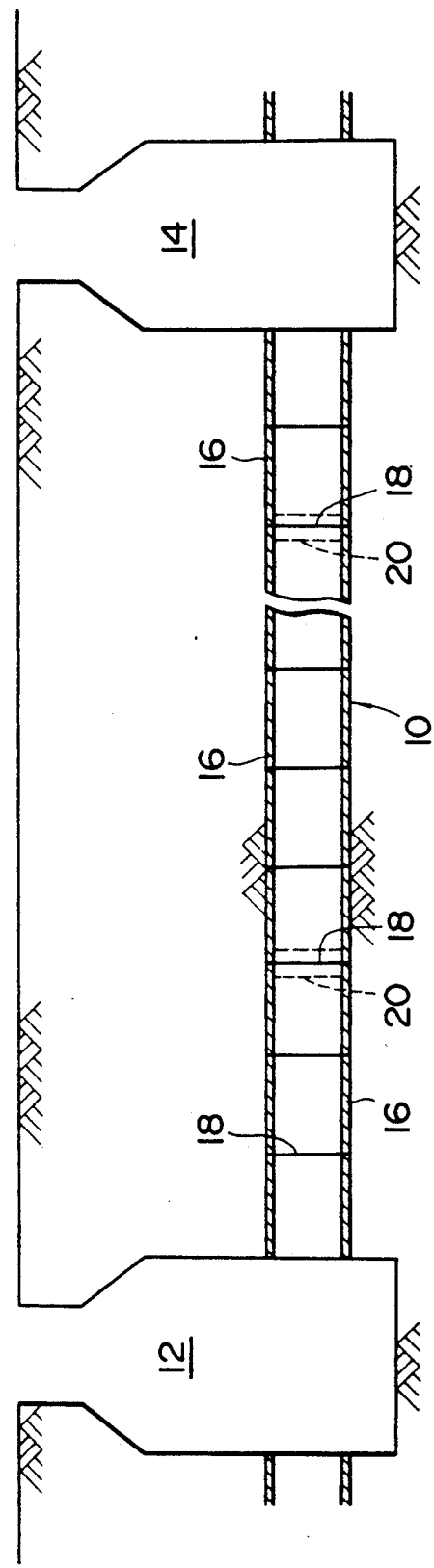
FIG. 1 is a sectional view showing an existing pipeline to be repaired and a liner according to the present invention.

In FIG. 1, an existing pipeline 10 is constructed under the ground to communicate with two manholes 12 and 14 separated by a distance.

In the embodiment shown in FIG. 1, the existing pipeline 10 consists of a plurality of small-diameter pipes 16 which are butted against one another at locations 18.

When one pipe 16 of the existing pipeline 10 and the adjacent pipes 16 are relatively displaced due to vibration, ground subsidence or the like, the gaps between the pipe joints or the cracks in the pipes are formed, resulting in water leakage. Therefore, a liner 20 for leakage-prevention is disposed at each of a plurality of leaking parts. When there is only one leaking part, only one liner 20 is disposed at that leaking part.

Figure 2:
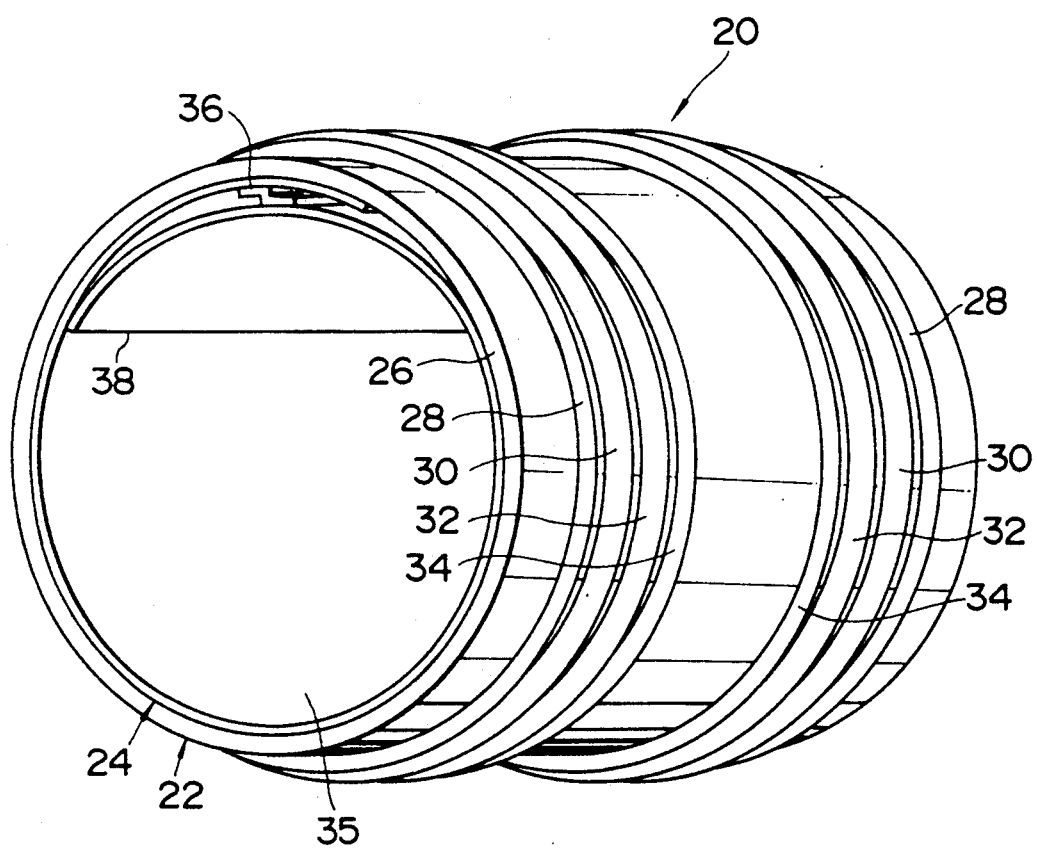
FIG. 2 is a perspective view showing a liner of a preferred embodiment according to the present invention.

As shown in FIG. 2, the liner 20 according to the present invention includes an elastically deformable sleeve 22, and an elastically deformable base 24 which is arranged inside the sleeve 22 in a spirally wound condition such that it is radially expandable, that is, in a cylindrically wound condition. The sleeve 22 is preferably made of a polymeric material such as rubber or other synthetic resins with impermeability. The base 24 is preferably made of a metal material such as stainless steel, copper or copper alloy with corrosion resistance.

Figure 3:
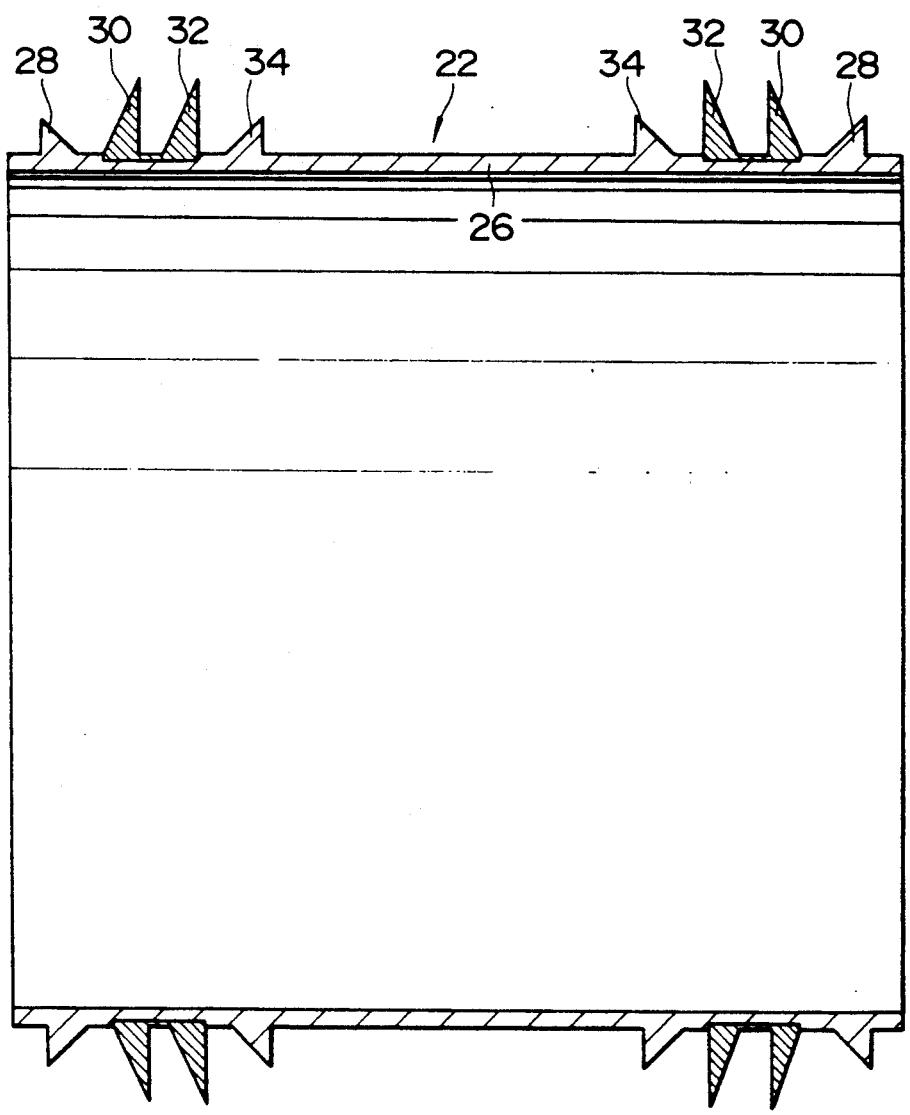
FIG. 3 is a sectional view showing a sleeve of a preferred embodiment according to the present invention.

As shown in FIG. 3, the sleeve 22 has a plurality of projections 28, 30, 32 and 34, formed on respective axial ends of a cylindrical portion 26 of the sleeve 22 and successively extended in the circumferential direction on the circumferential surfaces at the corresponding ends. As shown in FIG. 3, the projections 28, 30, 32 and 34 have cross-sectional shapes of right triangles, with the base of each right triangle formed at the side of the cylindrical portion 26.

Each projection 28 axially outermost located on sleeve 22, that is, at the endmost portion, and each projection 34 axially innermost located, that is, toward the center, are made of the same material as that of the cylindrical portion 26 and are integrally formed with the cylindrical portion 26. The intermediate projections 30 and 32 located between both projections 28 and 34 are made of a polymeric material which expands by absorbing water.

However, projections 30 and 32 may also be made of the same material as that of the cylindrical portion 26. The material for the projections 30 and 32 may be more elastically deformed and, particularly, more easily expanded than that of the projections 28 and 34. All of the projections 28, 30, 32 and 34 may be made of a polymeric material which expands by absorbing water.

As for the polymeric material which expands by absorbing water, synthetic rubber sold by Asahi Denka Kogyo Kabushiki Kaisha under the trade name of "Adeca Ultraseal" may be used.

Each inside portion of the projections 30 and 32 is embedded in the cylindrical portion 26, so that the projections 30 and 32 are prevented from axial displacement. Alternatively, projections 30 and 32 may be bonded to the cylindrical portion 26 or connected or combined integrally with the cylindrical portion 26 during formation or vulcanization.

Figure 4:
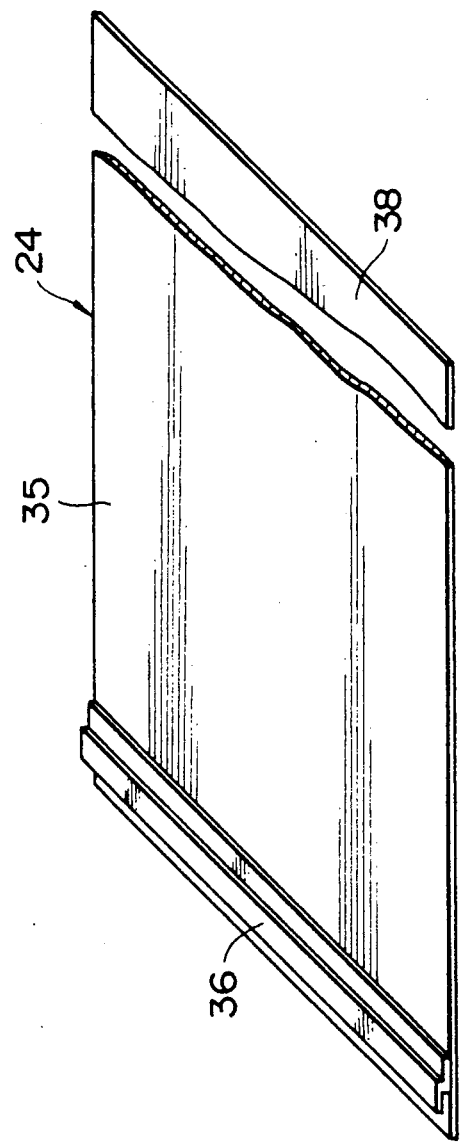
FIG. 4 is an extended perspective view showing a base of a preferred embodiment according to the present invention.

In an embodiment shown in FIG. 4, the base 24 comprises an elastically deformable base portion 35 of an elongate sheet shape.

A first engaging portion 36 is formed at one end of the base 24 in the longitudinal direction. The first engaging portion 36 has a Z-like cross sectional shape and consists of elongate metal fittings fixed to the base 24. The first engaging portion 36 extends over the whole area of the base 24 in its cross direction. A second engaging portion 38 which is received by the first engaging portion 36 and engages therewith is the other end of the base 24 in the illustrated embodiment but may be an engaging portion of another shape, for instance, an engaging portion made of similar metal fittings to the first engaging portion 36.

As shown in FIG. 2, the base 24 is deformed into a cylindrical form or a spiral form so that its end on which the first engaging portion 36 is located and that on which the second engaging portion 38 is located may overlap, and then, the base 24 is disposed within the sleeve 22.

Under this condition, the base 24 is restricted by the sleeve 22 and prevented from expanding radially by its own restoring force. In this manner, the relative movement of the sleeve 22 and the base 24 in the axial direction along the sleeve 22 is prevented without using any particular metal fittings.

In the embodiment shown in FIG. 2, the base 24 is wound such that its end, on which the first engaging portion 36 is located, is disposed outside the end on which the second engaging portion 38 is located. However, the base 24 may be wound such that its end, on which the first engaging portion 36 is located, is disposed inside the end on which the second engaging portion 38 is located.

The base 24 may be deformed into a spiral form when the base 24 is inserted into the sleeve 22 or may be deformed in a spiral form in advance so that the base 24 may be placed in the sleeve 22.

The inner diameter of the sleeve 22, the axial length of the sleeve 22, the thickness of the cylindrical portion 26, the height, the thickness and the cross-sectional shape respectively of each projection 28, 30, 32 and 34 are all arbitrarily selected depending on their mutual relationship, the dimensions of the pipe to be repaired for leakage-prevention and the dimensions of the portion to be repaired as well. However, the outer diameter of the sleeve 22 should be smaller than the inner diameter of the pipe to be repaired. Also, the inner diameter of the sleeve 22 should be smaller than the outer diameter of the base 24 at the time when the base 24 is expanded so that the engaging portions 36 and 38 can be engaged with each other.

In the illustrated embodiment of FIG. 3, the height of projections 28 and 34 is larger than the thickness of the cylindrical portion 26, and the height projections 30 and 32 is larger than that of the projections 28 and 34. However, the height of projections 28 and 34 may be made smaller than the thickness of the cylindrical portion 26 or equal to the thickness of the cylindrical portion 26. Also, the heights of the projections 28, 30, 32 and 34 may be made equal.

For instance, in case of the sleeve for a sewer pipe of 250 mm in bore diameter, the inner diameter of the sleeve 22, the thickness of the cylindrical portion 26 of the sleeve 22, the height of the projections 28 and 34 and the projections 30 and 32 may be defined as 180 to 220 mm, 0.5 to 1 mm, 2 to 5 mm, and 5 to 10 mm, respectively.

Though, in the illustrated embodiment of FIG. 2, the width of the base 24, namely, the axial length, is substantially equal to the axial length of the sleeve 22, the axial length of the base 24 need only be larger than the distance between projections 28, located at both endmost portions of the sleeve 22. Though the length of the base 24 is larger than that along the inside of the sleeve 22, it varies depending on the inner diameter of each pipe 16. The thickness of the base 24 may be smaller than that of the sleeve 22, and may be defined as 0.5 to 3 mm, for example.

A method of reparation by using the liner 20 will now be described.

Figure 5:
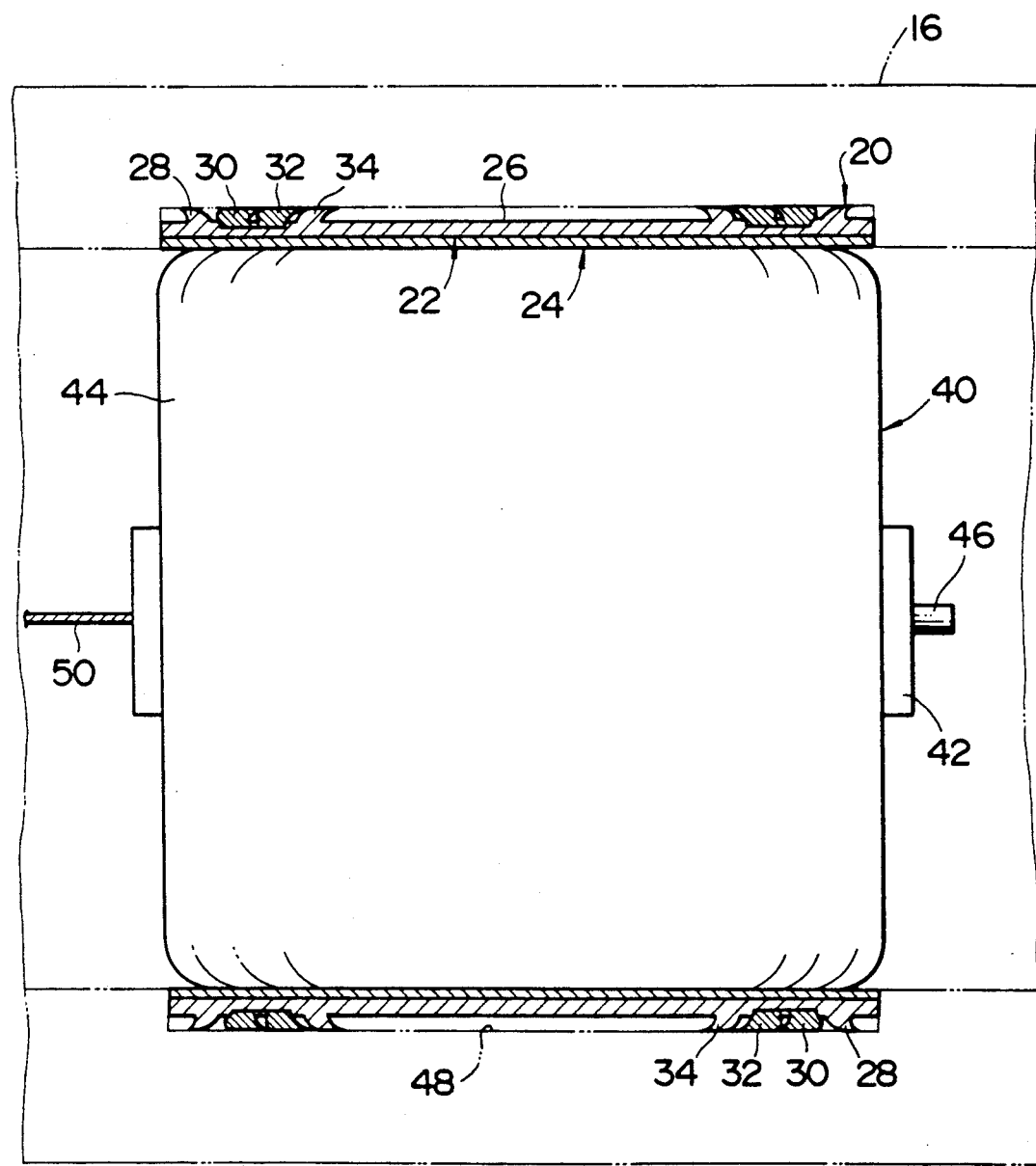
FIG. 5 is a sectional view showing the condition of a liner expanded by an expanding machine.

As shown in FIG. 5, firstly, the liner 20 is placed in an expanding machine 40 for expanding the liner 20.

The expanding machine 40 is provided with a shaft portion 42, and an expansion portion 44 such as a floating ring. The expansion portion 44 is fixed to the shaft portion and expanded radially by a pressure fluid, such as compressed air. As expanding machine 40, for instance, a water-sealing machine under the trade name of "Packer" by Toa Grout Kogyo Kabushiki Kaisha may be used. The expanding machine 40 is received into the base 24 with the expansion portion 44 contracted.

Subsequently, the expansion portion 44 is expanded radially by the pressure fluid supplied from a fluid source installed on the ground to a nipple 46 through a hose, such that the liner 20 does not displace to the expanding machine 40 and is maintained in that condition. The nipple 46 is mounted to the shaft portion 42, which has a fluid flow path to allow passage of pressure fluid supplied to the nipple 46.

As shown in FIG. 5, a recess 48 is formed in order to place the liner 20 within a portion of the pipe 16 to be repaired. The recess 48 continuously and circumferentially extends along the inner surface of the pipe 16. The axial length of the recess 48 is substantially equal to that of the liner 20, whereas the depth of the recess 48 is slightly smaller than the thickness of the liner 20 including the height of the projection 30. The portion to be repaired may be a connection portion, that is, a joint between the adjacent pipes 16, or a portion corresponding to a crack formed in the pipe 16.

Then, the liner 20 and the expanding machine 40 are moved from one end of the pipe 16 to the position of the recess 48 within the pipe 16. The liner 20 and the expanding machine 40 can be moved within the pipe 16 by pulling a rope 50 connected to the expanding machine 40. The liner 20 and the expanding machine 40 are moved together to a predetermined position by monitoring a picture image of the inside of the pipe 16 obtained by a television camera while moving the television camera together with the liner 20 and the expanding machine 40.

When the liner 20 and the expanding machine 40 are moved to the predetermined position within the pipe 16, the expansion portion 44 is further expanded radially by the pressure fluid supplied thereto through the nipple 46. Thus, the liner 20 is expanded radially such that both ends of the base 24 are slightly overlapped, that is, such that engaging portions 36 and 38 are mutually engaged with each other and pressed against the inner surface of the pipe 16. As a result, the sleeve 22 is compressed.

However, as each of the projections 28, 30, 32 and 34 has a triangular cross-sectional shape, these projections 28, 30, 32 and 34 are mostly elastically deformed when the liner 20 is pressed against the inner surface of the pipe 16. In the illustrated embodiment shown in FIG. 6, the projections 28, 30, 32 and 34 are bent toward the opposite side of the projection 30, toward the projection 32, toward the projection 34 and toward the opposite side of the projection 32, respectively, and then, further compressed. As a result, each of these projections is pressed by its restoring force against the inner surface of the pipe 16.

Since each of the projections 28 and 34 is formed integrally with the cylindrical portion 26, and the projections 30 and 32 are prevented from axial displacement, the base ends of the projections 28, 30, 32 and 34, that is, the portions at the side of the cylindrical portion 26, do not expand axially, even though the projections 28, 30, 32 and 34 are compressed. As a result, the projections 28, 30, 32 and 34 are firmly pressed against the inner surface of the pipe 16.

After the pressure fluid in the expansion portion 44 is removed, the expanding machine 40 is removed from the pipe 16 together with the television camera.

Figure 6:
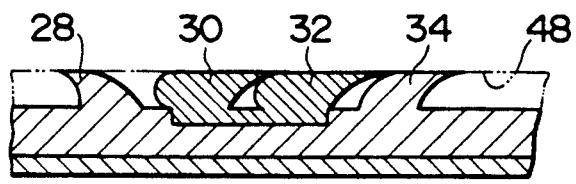
FIG. 6 is an enlarged sectional view showing the elastically deformed condition of a projection of a sleeve.
Figure 7:
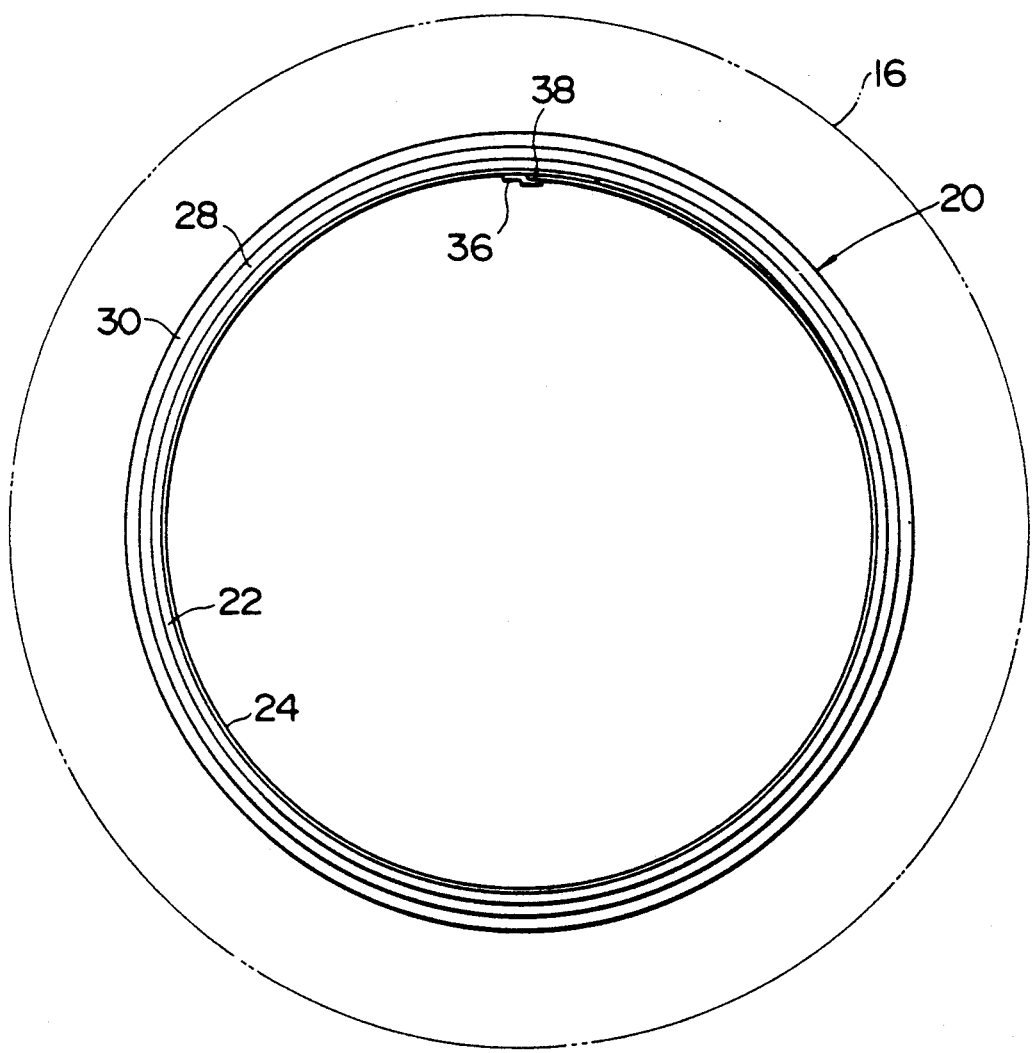
FIG. 7 is a side view showing the engaged condition of first and second engaging portions.

When the pressure fluid is removed from the expansion portion 44, the sleeve 22 applies a base-shrinking force to the base 24 and, therefore, the second engaging portion 38 of the base 24 is fitted into the first engaging portion 36 as shown in FIG. 7. Thus, though the base 24 shrinks slightly, this shrinkage is absorbed by a slight restoration of the projections 28, 30, 32 and 34. For this reason, the projections 28, 30, 32 and 34 remain pressed against the inner surface of the pipe 16 and compressed as shown in FIGS. 5 and 6. As a result, the water leakage into or from the pipe 16 is prevented, and the liner 20 is wholly disposed in the recess 48, i.e., not projecting into the pipe 16.

According to one embodiment of the liner 20, the height of projections 30 and 32 is higher than that of projections 28 and 34, and the polymeric material of the projections 30 and 32, which expands by absorbing water, tends to be more elastically deformable than the polymeric material of the projections 28 and 34, which does not expand by absorbing water. Because of this, when the liner 20 is pressed against the inner surface of the pipe 16, the projections 30 and 32 are largely deformed. As a result, the attachment of the liner 20 becomes much easier by increasing the shrinkage of the diameter of the base 24 for fitting the second engaging portion 38 into the first engaging portion 36.

The sleeve 22 does not always require projections 28, 30, 32 and 34. In such a case, the cylindrical portion 26 is directly pressed against the inner surface of pipe 16.

FIG. 7 appears to show that the projections 28 and 30 are not elastically deformed, while as a matter of fact the projections are deformed as mentioned above. Also, though it appears as if there were a void between the sleeve 22 and the base 24, such a void is not actually formed because the sleeve 22 is made of elastically deformable polymeric material.

When the water around the pipe 16 flows from a damaged portion of the pipe 16 or the water flowing through the pipe 16 enters the area between liner 20 and the pipe 16 after the liner 20 is attached to the pipe 16, the projections 30 and 32 absorb the water and expand. Thus, projections 30 and 32 are strongly pressed against the pipe 16 to maintain the water tightness between the liner 20 and the pipe 16. FIGS. 5 and 6 show that some voids may be formed between the adjacent projections, depending on the amounts of the deformation and expansion of the projections 30 and 32.

Since the base 24 has a sheet-like form, and the inner peripheral surface of the sleeve 22 is entirely supported by the base 24, the sleeve 22 is only slightly deformed by compression, when the force caused by the groundwater pressure or the like acts on the sleeve 22.

It is not always necessary to form the recess 48. In particular, when the pipe 16 to be repaired is for use of power lines, telephone cables or the like, the recess 48 need not be formed. However, particularly, in the case of a sewer pipe, the recess 48 prevents the foreign matter flowing with the sewage from being trapped by the liner 20, provided the liner 20 is disposed within the recess 48 such that it does not project therefrom.

It is preferable to clean the inside of the pipe 16 prior to the disposition of the liner 20 therein, and also to close the inlet of the pipe 16 so that another fluid such as sewage may not flow thereinto during repairs.

Figure 8:
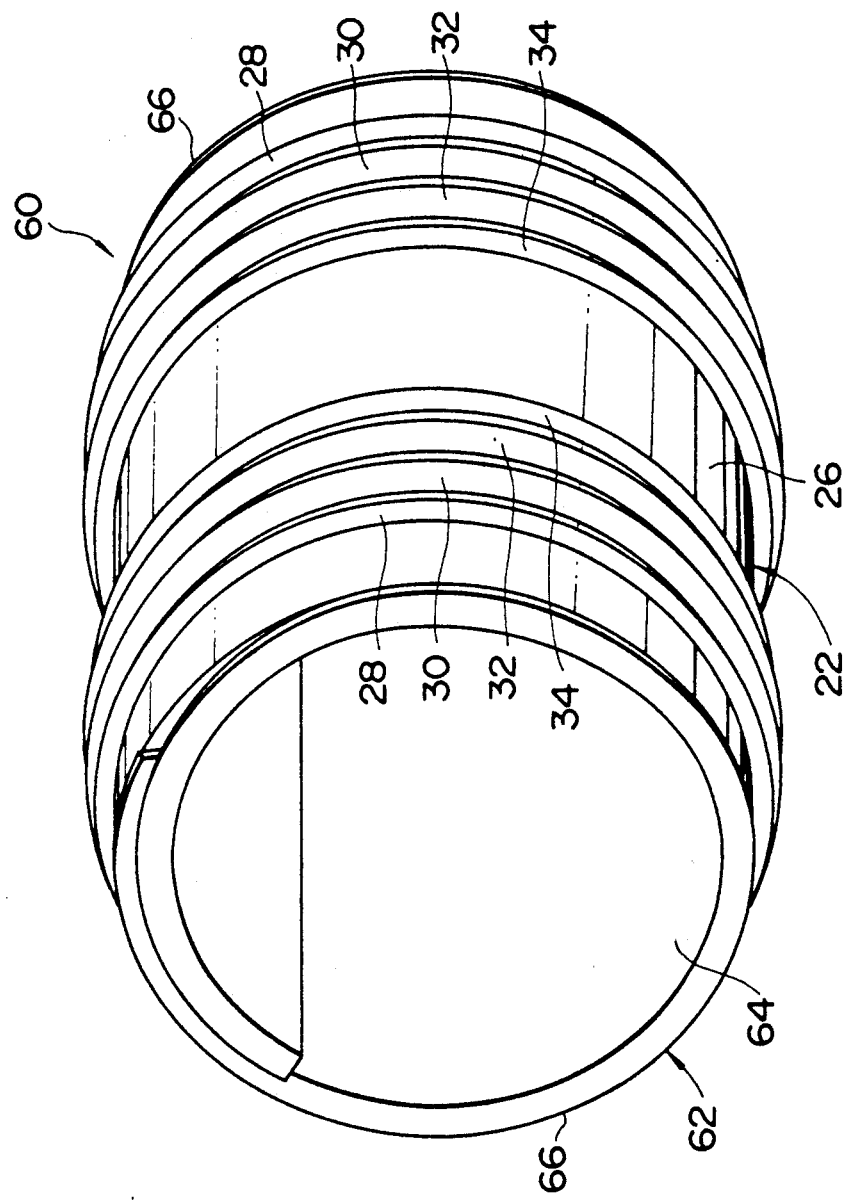
FIG. 8 is a perspective view showing a liner of another embodiment according to the present invention.

A liner 60 shown in FIG. 8 includes the sleeve 22 shown in FIG. 3 and a base 62 placed within the sleeve 22 in a spirally wound condition and expandable radially. The base 62 is preferably made of a corrosion-resistant metal material such as stainless steel, copper and copper alloy.

Figure 9:
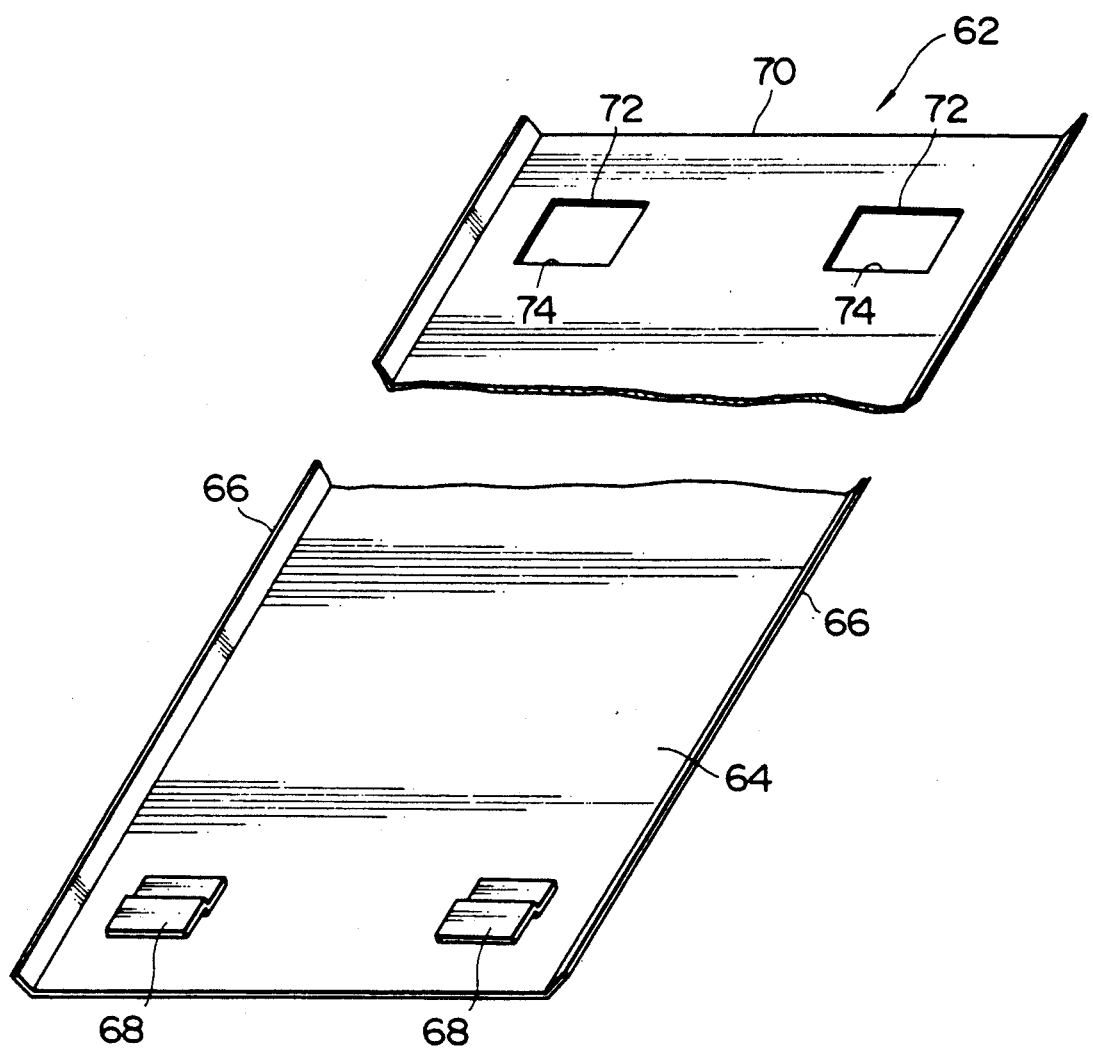
FIG. 9 is an extended perspective view showing a base used for the liner of FIG. 8.

As shown in FIG. 9, the base 62 has an elongate, sheet-like, elastically deformable base portion 64 and a deformation portion or rib 66 projecting from the same side from both edges of the base portion 64 in its cross direction. Each deformation portion 66 is deformed from the edge of the base portion 64 radially outward at a predetermined angle or by a predetermined radius of curvature, and successively formed along the entire length of the edge of the base portion 64.

At one end of the base portion 64, a pair of first engaging portions 68 are formed and separated at an interval in the cross direction of the base portion 64, while at the other end of the base portion 64, a plurality of second engaging portions 70 and 72 are formed.

Both first engaging portions 68 are metal fittings with a Z-letter cross sectional shape fixed to the base portion 64 in the illustrated embodiment of FIG. 9. When base portion 64 is expanded, these first engaging portions 68 are engaged with either of the second engaging portions 70 and 72. The second engaging portions 70 and 72 are, in the illustrated embodiment of FIG. 9, portions defining the other edge of the base portion 64 and rectangular holes 74 formed in the other end of the base portion 64, respectively. However, the engaging portions 66, 68 and 70 may have the other shapes. For instance, the second engaging portions 68 and 70 may be metal fittings similar to the first engaging portion 66.

In the embodiment of FIG. 9, the width of the base 62, namely, the axial length, is slightly longer than that of the sleeve 22. The base 62 is disposed inside the sleeve 22 under a spirally wound condition and is expandable radially. Thus, the end of the base 62, on which first engaging portion 68 is located, may be overlapped by the end on which the engaging portions 70 and 72 are located. In this way, the sleeve 22 is located on the outer periphery of the base 62 and between the deformation portions 66.

Figure 10:
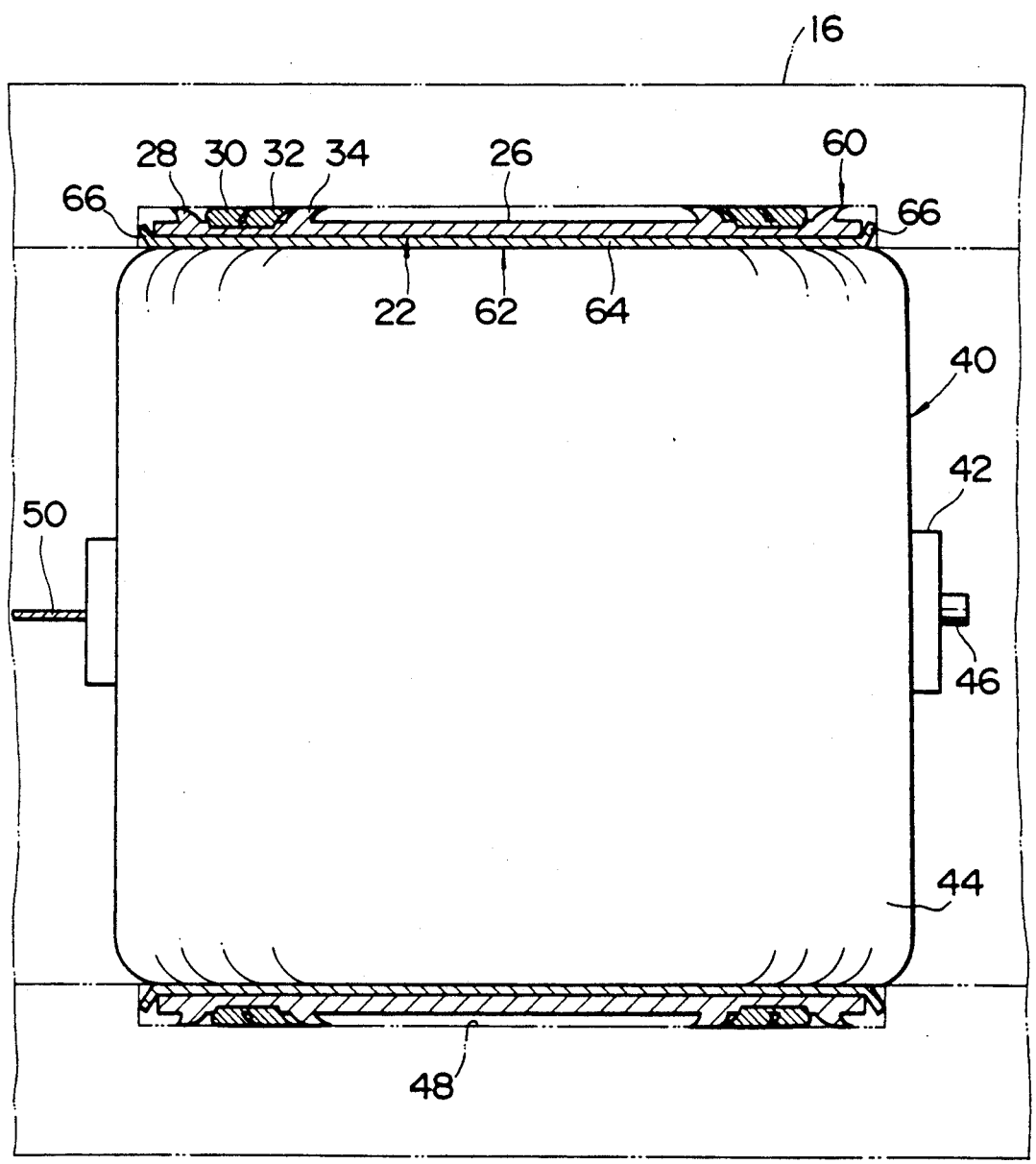
FIG. 10 is a sectional view showing the condition of the liner of FIG. 8 expanded by an expanding machine.

As shown in FIG. 10, the liner 60 is disposed by the use of the expanding machine 40 into the recess 48 formed on the inner surface of the pipe 16 during repairs, as is the case with the liner 20 shown in FIG. 2. Thus, the second engaging portion 70 or 72 of the liner 60 is fitted into the first engaging portion 68, and the projections 30, 32, 34 and 36 of the sleeve 22 pressed against the inner surface of the pipe 16. As a result, the water leakage from and into the pipe 16 is prevented, and the liner 60 is disposed wholly within the recess 48, i.e., not projecting into the pipe 16.

Since the liner 60 has the second engaging portions 70 and 72 (or the first engaging portion 68) at a plurality of positions at intervals in the circumferential direction of the base portion 64, the first engaging portions 68 can be surely engaged with either of the second engaging portions 70 or 72, even though there are some errors in the dimensions of the pipe 16.

Also, since both overlapped ends of the base 62 are prevented from the relative movement in the axial direction of the base 62 by the deformation portion 66, the base 62 is correctly expanded and maintained in its correct condition within the pipe 16.

Furthermore, as the base 62 has the deformation portion 66 extending over the entire base portion 64 in the longitudinal direction, the mechanical strength of the base 62 against the force directed radially inward with respect thereto is improved after the first engaging portion 68 is engaged with either second engaging portion 70 or 72.

However, when improvement of the mechanical strength of the base 62 is not its purpose, each deformation portion 66 need not be continuous, and may be formed only at the end on which first engaging portion 68 is formed.

Figure 11:
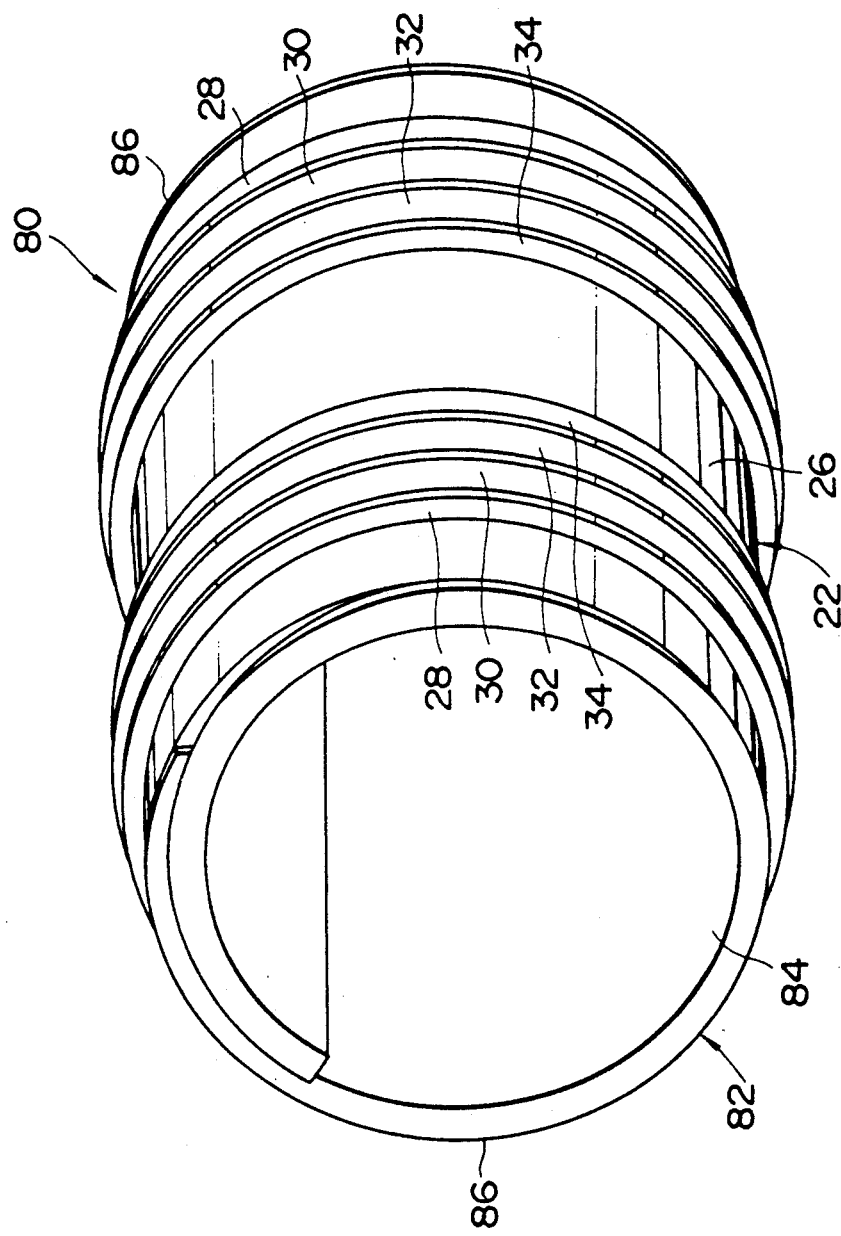
FIG. 11 is a perspective view of a liner of a further embodiment according to the present invention.

A liner 80 shown in FIG. 11 includes the sleeve 22 shown in FIG. 3, and a base 82 placed within the sleeve 22 in a spirally wound condition that is expandable radially. The base 82 is preferably made of a corrosion-resistant metal material such as stainless steel, copper and copper alloy.

Figure 12:
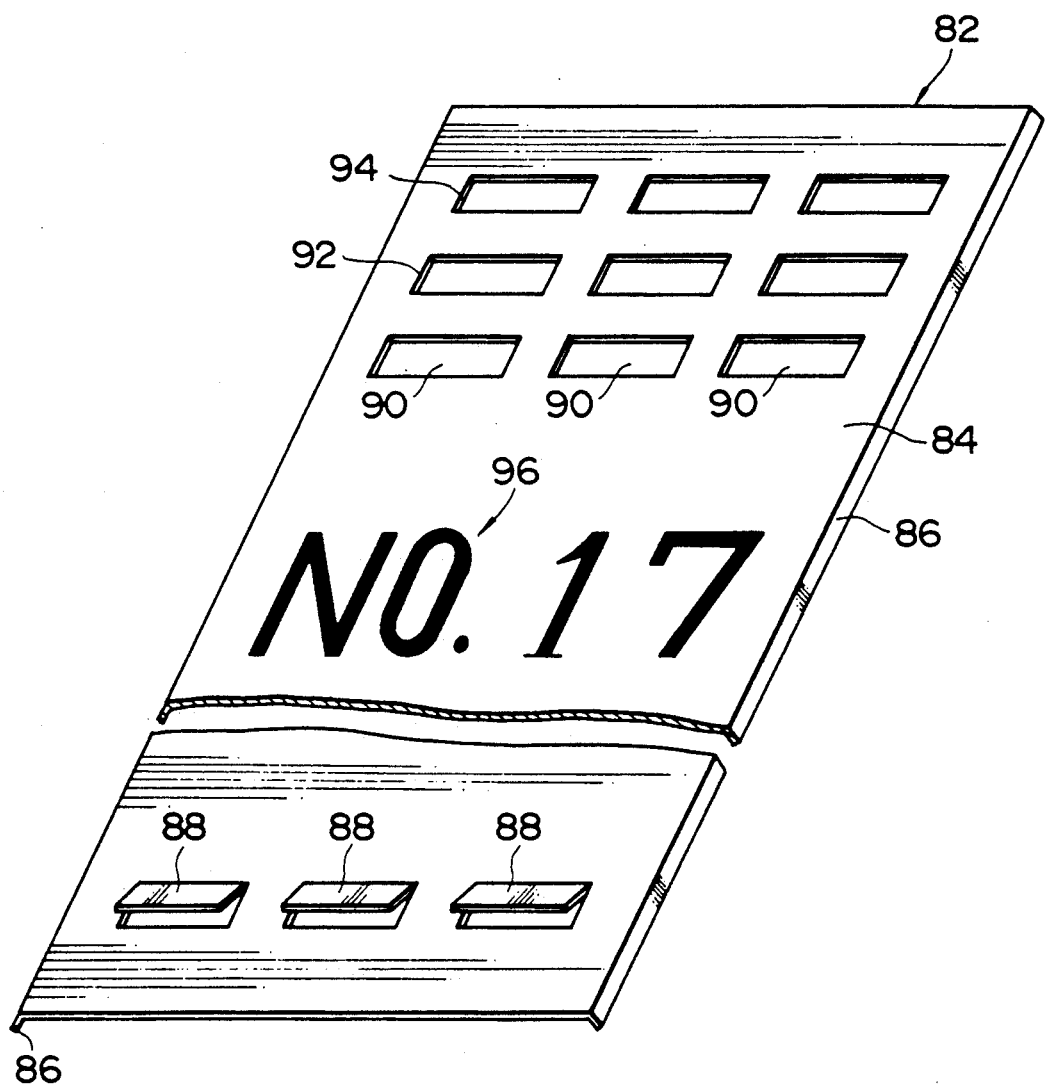
FIG. 12 is an extended perspective view showing a base used in the liner of FIG. 11.

As shown in FIG. 12, the base 82 includes an elastically deformable base portion 84 of an elongate sheet-like form and a deformation portion 86 bent toward the same side from both edges of the base portion 84 in its cross direction.

Each deformation portion 86 is deformed from the corresponding edge of the base portion 84 radially outward at a predetermined angle or by a predetermined radius of curvature and successively formed along the entire edge of the base portion 84.

At one end of the base portion 84, a plurality of first engaging portions 88 are formed at intervals in the cross direction of the base portion 84. On the other hand, at the other end of the base portion 84, a plurality of second engaging portions 90, 92 and 94 to be selectively engaged with the first engaging portion 88 when the base portion 84 is radially expanded are formed.

In the illustrated embodiment of FIG. 12, each of the first engaging portions 88 consists of a tongue portion formed by embossing a part of the base portion 84 from one side to the other side thereof, namely, from the outside (the side of the deformation portion 86) to the inside by means of stamping or the like. On the other hand, each of the second engaging portions 90, 92 and 94 consists of portions which define the holes formed in the other end of the base portion 84. However, the first and the second engaging portions may be of other mutually engaging structure.

Each code 96 peculiar to each base 82 is visually marked on the inner surface of the base portion 84. Each code 96 is also preferably ascertainable by a television camera. However, each code 96 may be capable of being photographed or capable of being read out by a code reader. Such code 96 can be formed by means of printing, engraving or the like.

In the illustrated embodiment of FIG. 12, each code 96 consists of figures and letters "No. 17", but it may be alternatively consist of bar codes, alphabet, Chinese characters, hiragana, katakana, pictures and so forth, provided each code can be distinguished from liner 80.

As shown in FIG. 11, the base 82 is placed inside the sleeve 22 in a spirally wound condition, such that the first engaging portion 88 projects inside and the end portion of base 82, on which the first engaging portion 88 is positioned, overlaps the end portion on which the second engaging portions 90, 92 and 94 are located.

The inner diameter of the sleeve 22 is smaller than the outer diameter of the base portion 84 when the base 82 is expanded, such that the first engaging portion 88 engages the predetermined second engaging portions 90, 92 or 94.

Figure 13:
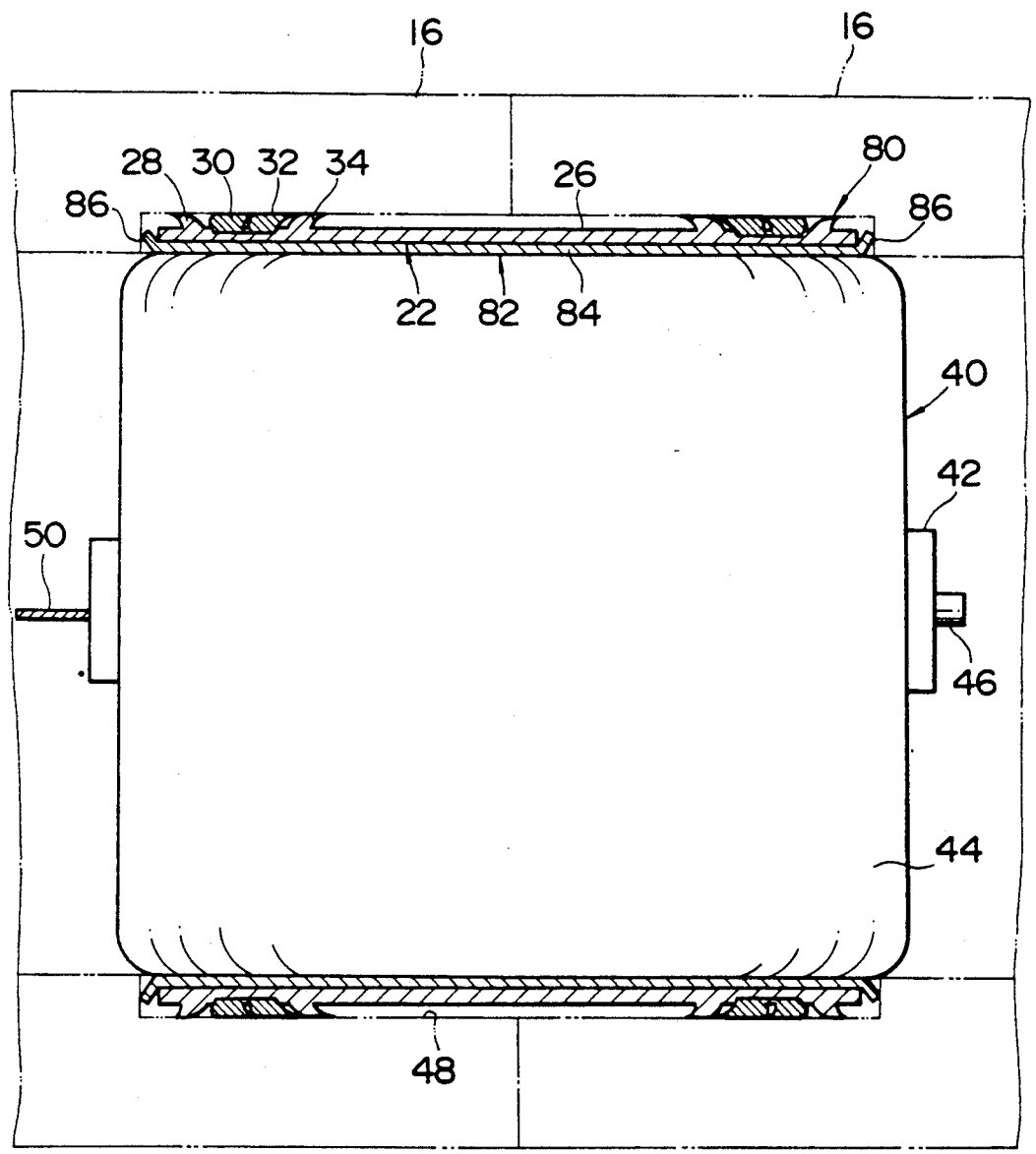
FIG. 13 is a sectional view showing the condition of the liner of FIG. 11 expanded by an expanding machine.

In the illustrated embodiment of FIG. 13, the thickness of cylindrical portion 26 of the sleeve 22 is substantially equal to the projection height of the deformation portion 86 of the base 82. Therefore, large parts of the projections 28, 30, 32 and 34 of the sleeve 22 project radially outward from the base 82.

The axial length of the sleeve 22 and that of the base 82 vary depending on the inner diameter of the pipe 16 to be repaired. However, the width of the base 82, namely, its axial length, is slightly larger than that of the sleeve 22. Also, the thickness of the base portion 84 may be smaller than that of the sleeve 22.

As shown in FIG. 13, during repairs, the liner 80 is also placed in the recess 48 formed in the inner surface of the pipe 16 by the use of the expanding machine 40, similar to the liners 20 and 60 shown in FIGS. 2 and 8, respectively. Thus, the liner 60 is maintained such that the first engaging portion 88 is fitted into either of the second engaging portions 90, 92 and 94 and the projections 28, 30, 32 and 34 of the sleeve 22 are pressed against the inner surface of the pipe 16. As a result, the water leakage from and into the pipe 16 is prevented, and the liner 80 is placed wholly within the recess 48, i.e., not projecting into the pipe 16.

When the liner 80 is disposed as described above, each code 96 is located such that it may be photographed by a television camera from inside the existing pipeline 10.

When the existing pipeline 10 is a sewer pipe, the liner 80 is placed so that each code 96 may appear at an upper position within existing pipe 10. As a result, there is little risk that codes 96 might be damaged by the sewage, because the sewage flows only along the bottom portion of the sewer pipe except in the event of a large rainfall.

When a plurality of locations within the existing pipeline 10 are repaired at the same time or in turn, the liners 80 with mutually different codes 96 are used. Also, when the codes 96 on each pipe 16 defining the existing pipeline 10 are marked to be photographed from inside the existing pipeline 10 by a television camera, a liner 80 having another code 96 different from those previously marked is used.

When a television camera moves through the existing pipeline 10 and monitors the inside thereof, the repaired portion can be confirmed by the monitored code 96 for the liner 80.

The code 96 for each liner 80 disposed at a repaired position is filled in a register together with a term which specifies the repaired position and the date when the position is repaired, for instance. In this manner, the next position to be repaired can be confirmed on the basis of the liners 80 which have been disposed in the repaired positions at that time. Therefore, subsequent maintenance operations become easy. The code 96 for the liner 80 to be used for the next operation shall be one that has not previously been used.

As the terms specifying the repaired portions, the distance from the manhole 12 (or 14), may be used, each number specifying the repaired pipes, repaired joints or the like.

As the numbers specifying the repaired pipes, the number of the pipes 16 between the manhole 12 (or 14) and the repaired pipe or another arbitrary location-defining number may be used, for instance. Likewise, as numbers specifying the repaired joints, the number of turns of the joints between the manhole 12 (or 14) and the repaired pipe or other arbitrary location-defining numbers may be used. In either case, when new pipes are set up or prior to repair, the pipes may be numbered or the numbering may be done only in the register.

Since the liner 80 also has the second engaging portions 90, 92 and 94 at a plurality of positions at intervals in the circumferential direction of the base portion 84, both engaging portions are surely engaged with each other, even if there is an error in the dimensions of the pipe 16.

Also, since both relatively overlapped end portions of the base 82 are prevented from relative axial movement by the deformation portion 86, the base 82 is correctly expanded and maintained in a correct condition within the pipe 16.

Furthermore, as the base 82 has the deformation portion 86 extending entirely in the longitudinal direction of the base portion 84, the mechanical strength of the base 82 against the force directed radially inward is improved, after the first engaging portion 88 is engaged with the second engaging portion 70, 72 or 74.

However, when the improvement of the mechanical strength of the base 82 is not a goal, each deformation portion 86 need not be continuous and may be formed only at the end portion of base 82 where the first engaging portion 88 is formed.

Figure 14A:
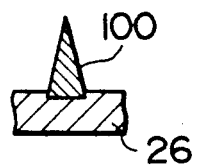
FIGS. 14(A), (B), (C), (D) and (E) are sectional views respectively showing projections of the sleeves of further embodiments according to the present invention.
Figure 14C:
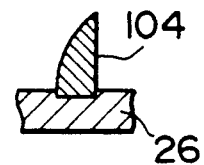
Figure 14B:
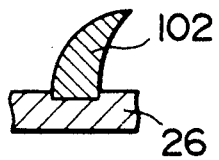
Figure 14D:
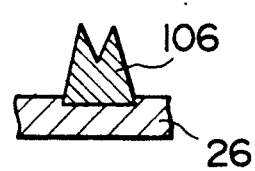

The projection of the sleeve 22 may have a cross-sectional shape other than the above-mentioned shapes. A projection 100 shown in FIG. 14(A) has a cross-sectional shape of isosceles triangle and each of projections 102 and 104 shown in FIGS. 14(B) and (C) has a cross-sectional shape like a brush-tip. A projection 106 shown in FIG. 14(D) has a cross-sectional shape of an inverted W-letter.

Judging from the projections 100, 102 and 104, the water tightness between the liner and the pipe 16 is maintained by pressing the projections against the inner surface of the pipe 16 similarly to the above-described projections 28, 30, 32 and 34, even though there is irregularity in the inner surface of the pipe 16.

Figure 14E:
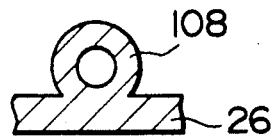

However, the cross-sectional shape of a projection may be trapezoidal or other shapes. A projection 108 shown in FIG. 14(E) is tubular in its cross-sectional shape. The projection 108 is elastically deformed when a liner bearing such a projection 108 is pressed against the inner surface of a pipe 16.

It is not always necessary that the engaging portions used as fixing means for maintaining the base in expanded condition extend in the cross direction of the base. Such fixing means may have different shapes from those of the above-mentioned embodiments or may be similar to those embodiments.

Figure 15:
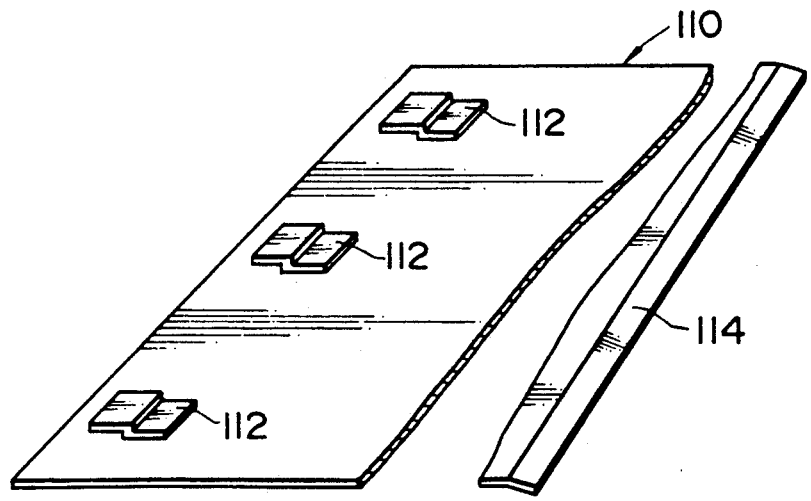
FIG. 15 is a perspective view showing a base of a further embodiment according to the present invention.

A base 110 shown in FIG. 15 has engaging portions 112 provided at a plurality of positions separated by intervals in the cross direction at one longitudinal end of the base 110. The engaging portion 112 consists of Z-letter, cross-section metal fittings that are fixed to the base 110 at intervals in the cross direction of the base 110. An engaging portion 114 of exemplary cross-section (i.e., slightly bent relative to the other portions of base 110) that is received and engaged with the engaging portion 112 is located at the other end of the base 110 in the illustrated embodiment. The engaging portion 114 may have another shape.

Figure 16A:
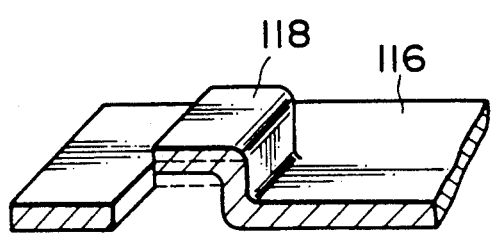
FIGS. 16(A), (B) and (C) are views respectively showing engaging portions of further embodiments according to the present invention.
Figure 16B:
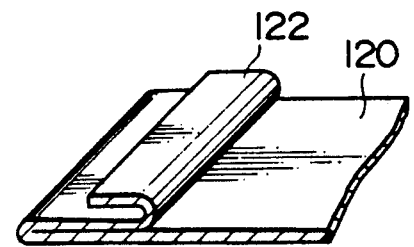
Figure 16C:
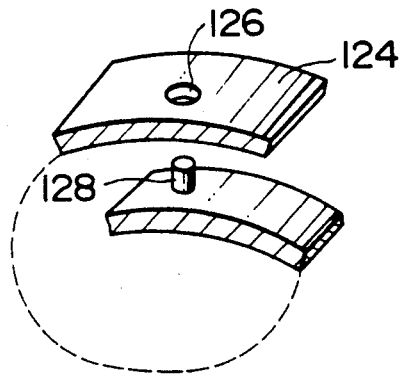

Another engaging portion may be a tongue portion 118 formed by embossing a part of the base 116 from one side to the other side of the base 116 by means of stamping, as shown in FIG. 16(A). Also, an engaging portion 122 may be formed by folding one end of a base 120 into a Y-like shape, as shown in FIG. 16(B). Furthermore, an engaging portion 126 may consist of a plurality of holes (or grooves) formed in one end portion of a base 124, as shown in FIG. 16(C). When female engaging portion 126 is used, the other engaging portion can be formed into a projection 128 at the other end of the base 124.

Figure 17:
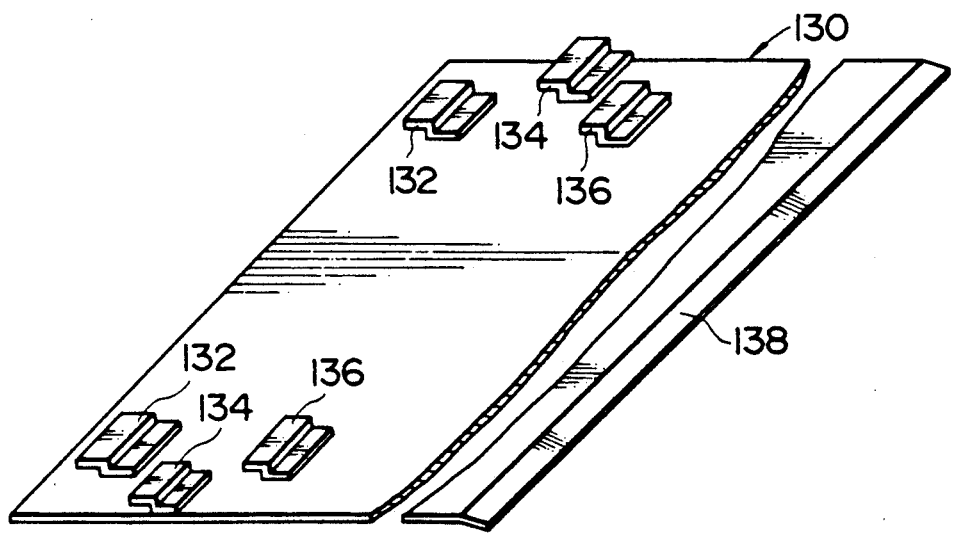
FIG. 17 is a perspective view showing a base and its engaging portion of a yet further embodiment according to the present invention.

The fixing means used for a base 130 shown in FIG. 17 has a plurality of first engaging portions 132, 134 and 136, formed along a plurality of respective virtual lines at intervals in the longitudinal direction of the base 130, and a second engaging portion 138 to selectively engage with the first engaging portion 132, 134 or 136. Each first engaging portion 132, 134 and 136 consists of Z-like metal fittings fixed at predetermined positions at one end of the base 130. The second engaging portion 138 is the other end of the base 130 and is slightly bent relative to the other portions thereof, but may be formed of different shapes.

Figure 18:
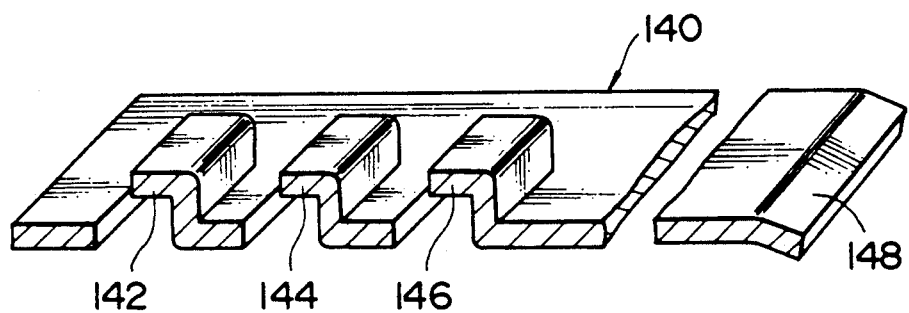
FIG. 18 is a perspective view showing an engaging portion of a still further embodiment according to the present invention.

The fixing means used for a base 140 shown in FIG. 18 has a plurality of first engaging portions 142, 144 and 146, formed in a matrix-like configuration at one end of the base 140, and a second engaging portion 148 which is the other end of the base 140. Each of the first engaging portions 142, 144 and 146 is a tongue formed by embossing a part of the base 140 from one side to the other by means of stamping or the like. The second engaging portion 148 is slightly bent relative to the other portions of base 140, but may be of a different shape.

Figure 19:
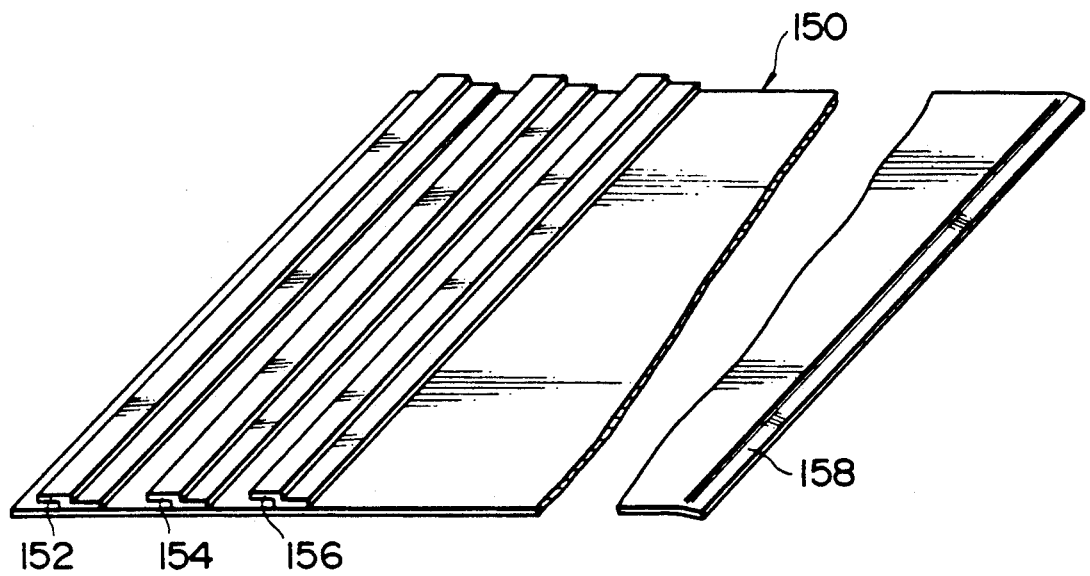
FIGS. 19, 20 and 21 are perspective views respectively showing bases of still further embodiments according to the present invention.

The fixing means used for a base 150 shown in FIG. 19 has a plurality of first engaging portions 152, 154 and 156, extending in parallel in the cross direction and separated at intervals along the longitudinal direction of the base 150, and a second engaging portion 158 to selectively engage with the first engaging portions 152, 154 or 156. The first engaging portions 152, 154 and 156 consist of Z-like metal fittings, fixed at predetermined portions of one end of the base 150 and extending successively along the cross direction of the base 150. The second engaging portion 158 is the other end of the base 150 and is slightly bent toward the other portions thereof, but may be formed of other shapes.

Figure 20:
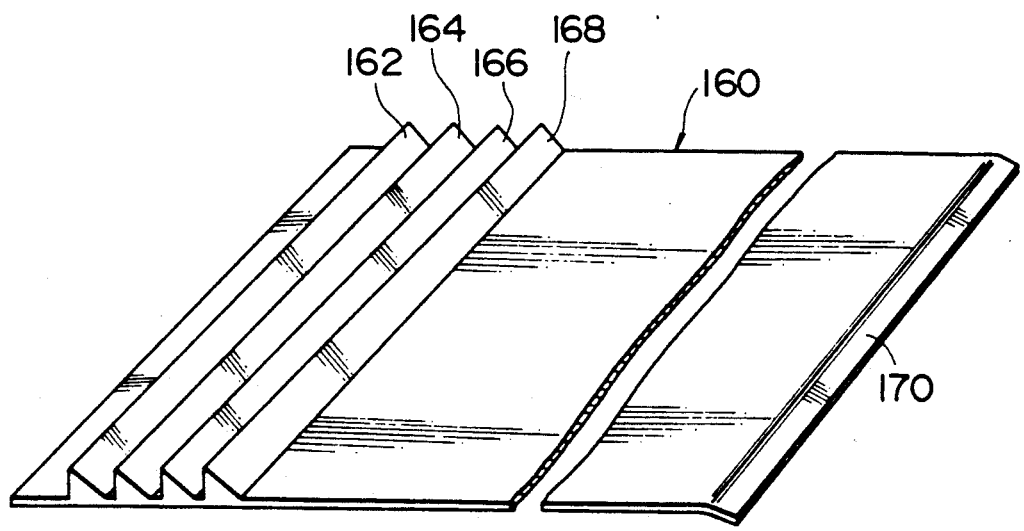

The fixing means used for a base 160 shown in FIG. 20 has a plurality of engaging portions 162, 164, 166 and 168, disposed on one end of the base 160 at intervals in the longitudinal direction thereof, and a second engaging portion 170 to engage with one of the first engaging portions 162, 164, 166 or 168. Each first engaging portion 162, 164, 166 and 168 consists of a member having a triangular cross section and is fixed to the base 160. The second engaging portion 170 is the other end of the base 160 and is bent to easily engage the first engaging portion 162, 164, 166 and 168. Each first engaging portion 162, 164, 166 and 168 may be divided into a plurality of parts in the cross direction of the base 160.

Figure 21:
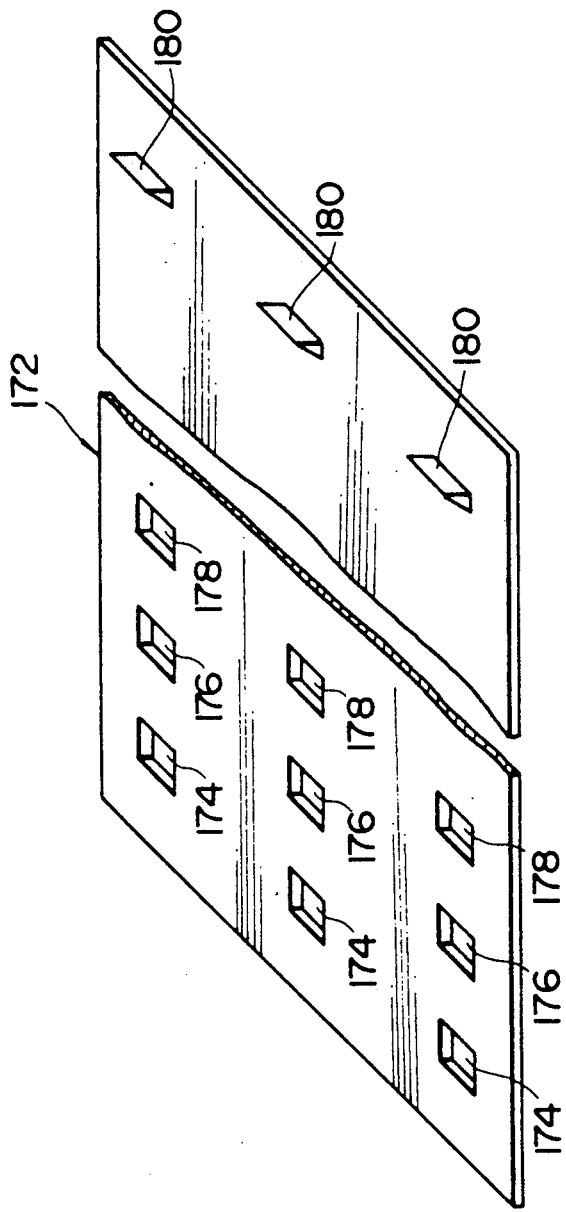
Figure 22:
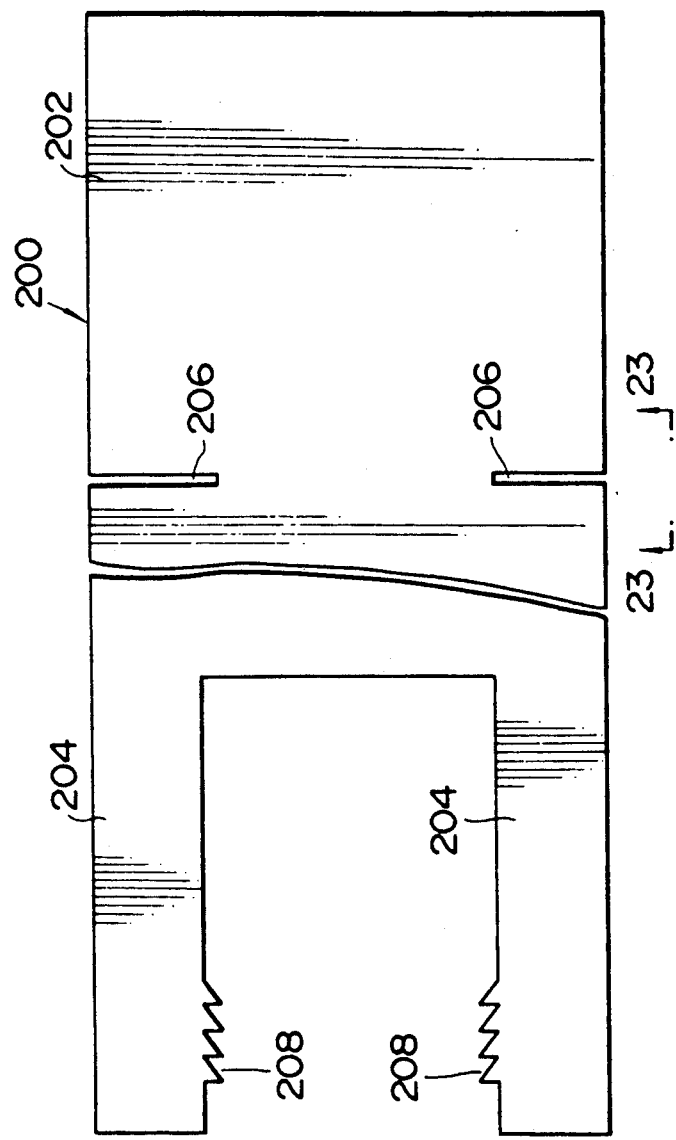
FIG. 22 is an extended view showing a base of a still further embodiment according to the present invention.
Figure 23:
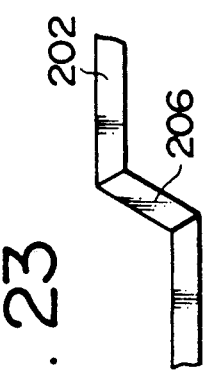
FIG. 23 is an enlarged side view taken along a line 23—23 in FIG. 22.

The fixing means used for a base 172 shown in FIG. 21 has a plurality of engaging portions 174, 176 and 178 consisting of rectangular holes in a matrix-like configuration, formed at one end of the base 172, and an engaging portion 180 consisting of a plurality of projections provided at the other end of the base 172. Each projection 180 corresponds to one set of the holes 174, 176 and 178 which, in turn, correspond to a matrix row, and each projection 180 engages one corresponding hole. The holes 174, 176 and 178 extend through the base 172 in its thickness direction, and a pair of confronting sides of the rectangle are formed in the cross direction of the base 172. The engaging portion 180 has a cross-sectional shape of a right triangle and is fixed to the base 172, so that one of two sides crossing at right angles in the right triangle is at the other side of the base 172 and the other is adjacent and parallel to the base 172.

A base 200 shown in FIGS. 22, 23, 24 and 25 has a sheet-like base portion 202 and a pair of belt-like extension portions 204 extending in a spaced, parallel relationship in the cross direction of the base portion 202 from one end of the base portion 202. The end of the base portion 202 on the opposite side of the extension portion 204 is deformed, such that it is slightly larger than other portions of the base portion 202 in thickness in its cross direction.

In the deformed portions of the base portion 202, a pair of elongate notches 206 are formed at an interval in the cross direction of the base portion 202. The notches 206 correspond to the extension portions 204 and extend toward the center from the end of the base portion 202 in its cross direction to receive the corresponding extension portions 204. The length of each notch 206 is approximately the same as the width of each corresponding extension portion 204. In the inside of the tip part of the extension portion 204, a saw portion 208 is formed. Each tooth of the saw portion 208 is capable of engaging the portions defining each notch 206 of the base portion 202.

Figure 24:
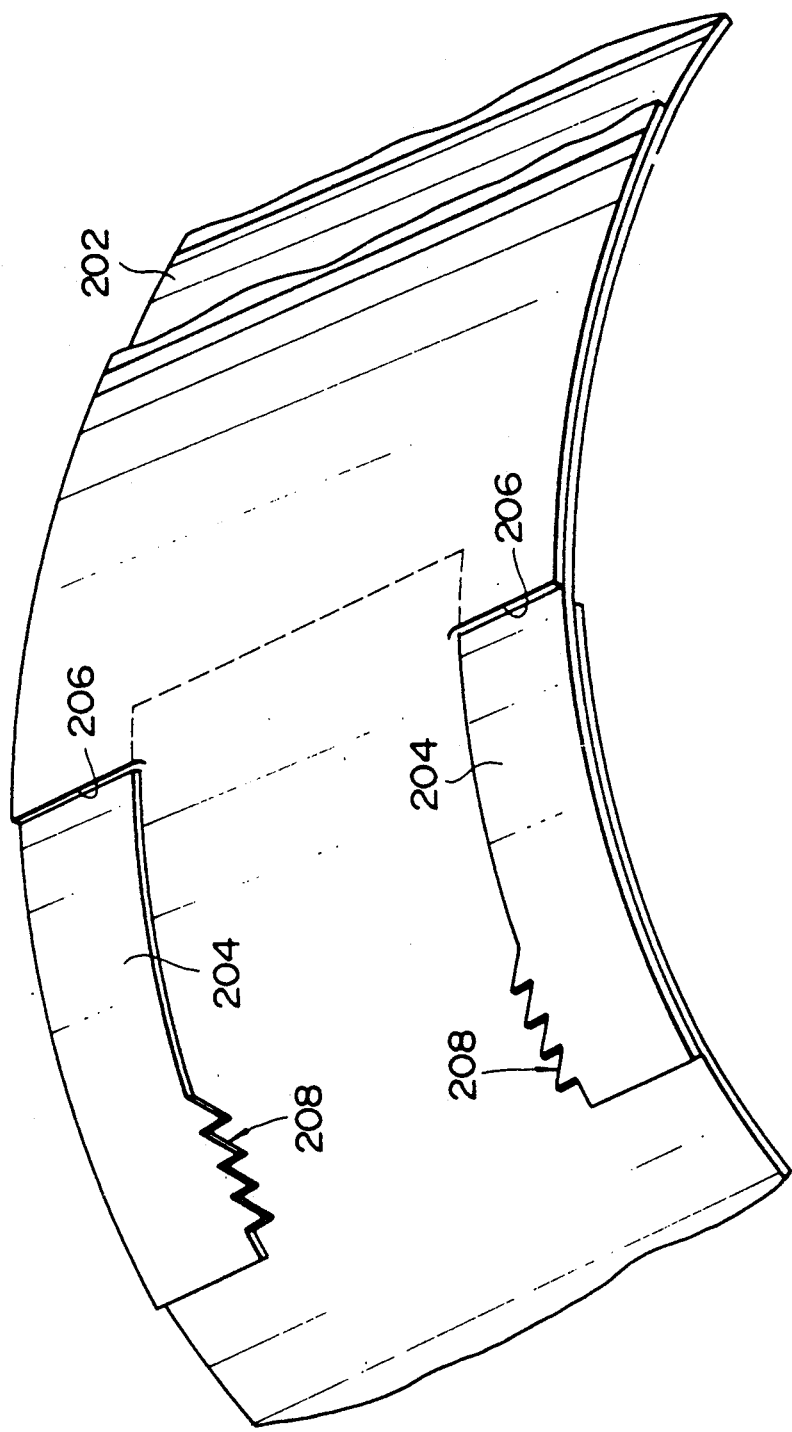
FIG. 24 is an enlarged perspective view showing the condition prior to the engagement of the engaging portion of the base of FIG. 22.
Figure 25:
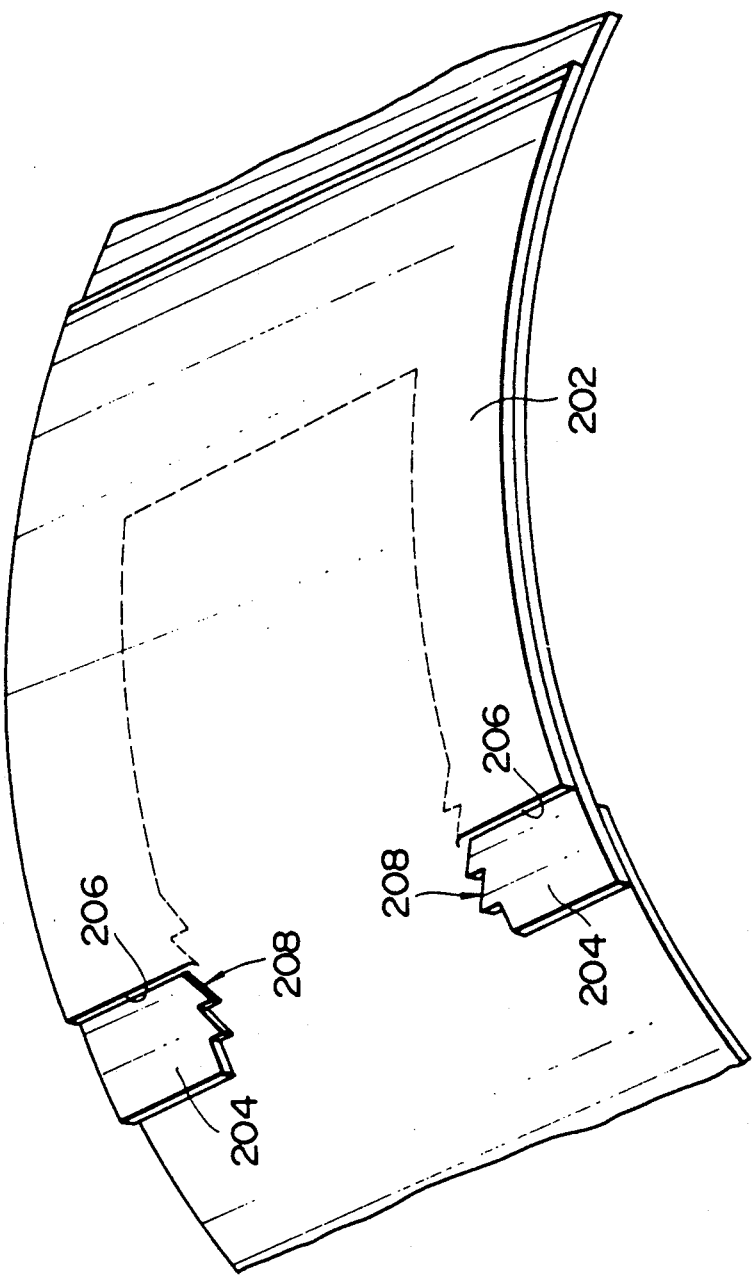
FIG. 25 is a perspective view showing the engaged condition of the engaging portion of the base of FIG. 22.

As shown in FIG. 24, the base is disposed inside the sleeve in a wound condition, such that the extension portion 204 extends through the notch 206 from the inside to the outside of the base portion 202, and the greater part of the extension portion 204 is located outside the base portion 202. Also, as shown in FIG. 25, when any the teeth in the saw portion 208 engage with the portion defining the notch 204, the base portion 202 is maintained in a cylindrically expanded condition. Specifically, the teeth in the saw portion 208 and the portions defining the notch 206 in the base portion 202 act as the fixing mean to maintain the base portion 202 in the expanded condition.

Figure 26:
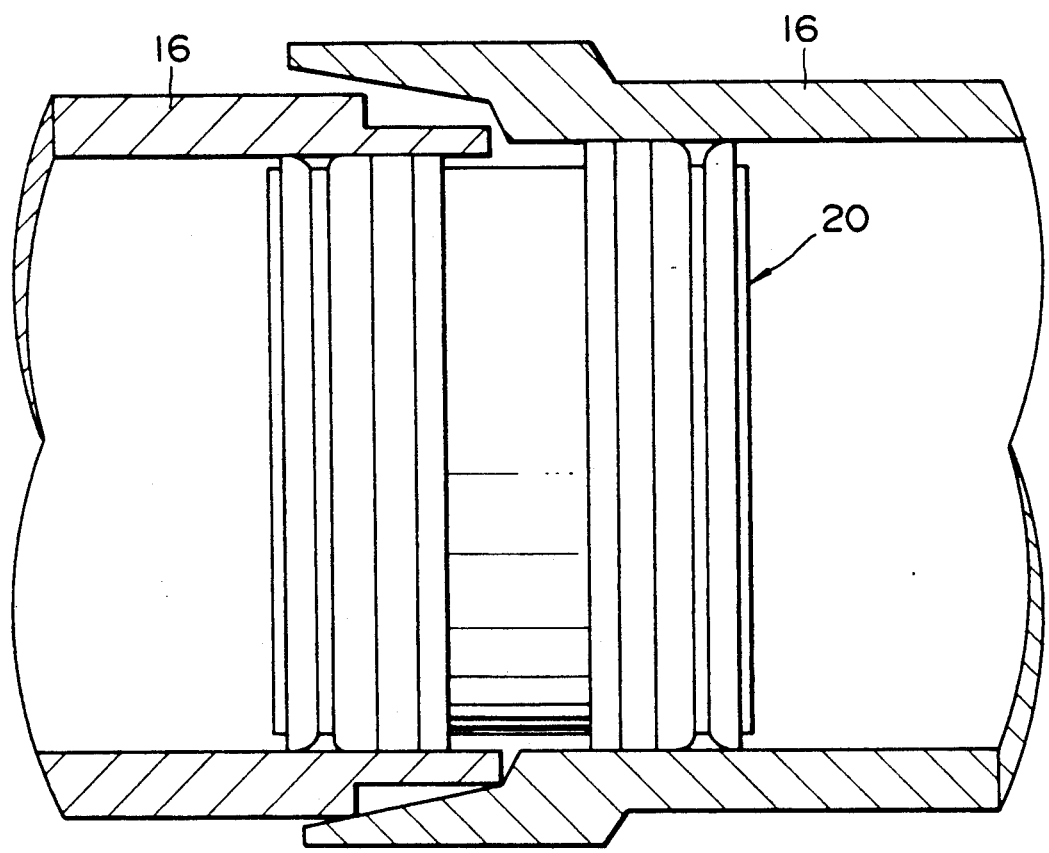
FIG. 26 is a view of a liner arrangement inside mutually displaced pipes of an embodiment according to the present invention.

The sleeve 22 may dispense with any projection. However, when using the liner 20 having the sleeve 22 provided with a plurality of projections (for example, the liner 20 as shown in FIG. 26), even though the adjacent pipes 16 are mutually displaced, the inside and circumference of both pipes 16 can be separated from each other.

The present invention can be applied for leakage-prevention not only in the case of actually leaking and defective portions, but also for preventing possible leakage with lapse of time of portions, such as joints of newly built pipes.

What is claimed is:

1. A liner for repairing a pipeline disposed on an inner surface of a pipe defining said pipeline, comprising:
    an elastically deformable sleeve having impermeability;
    a base having a sheet-like base portion disposed inside said sleeve in a radially expandable, wound cylindrical form; and
    fixing means disposed on said base and for maintaining said base portion in a substantially cylindrical form when said base portion is expanded radially within said sleeve.

2. A liner according to claim 1, wherein said base portion has an axial length substantially equal to the axial length of said sleeve.

3. A liner according to claim 1, wherein said sleeve has an elastically deformable cylindrical portion and a plurality of elastically deformable projections formed at axial intervals on the circumferential surface of said cylindrical portion, said projections successively extending in a circumferential direction of said cylindrical portion.

4. A liner according to claim 1, wherein said sleeve has an elastically deformable cylindrical portion and an outside, an inside, and at least one intermediate elastically deformable projections formed at respective ends of said cylindrical portion at axial intervals, each projection successively extending along the circumference of the corresponding end of said cylindrical portion in the circumferential direction,
    said intermediate projection or projections comprising a polymeric material which expands by absorbing water, and
    said base portion having a longer axial length than the distance between the outside ends of said outside projections in an axial direction of said sleeve.

5. A liner according to claim 4, wherein each intermediate projection is restrained from expanding in the axial direction of said sleeve at a portion at a side of said cylindrical portion.

6. A liner according to claim 4, wherein projection thickness in the axial direction of said sleeve is gradually decreased from a portion of said projection adjacent said cylindrical portion outward in a radial direction of said sleeve.

7. A liner according to claim 6, wherein said intermediate projections have a greater height than said outside projections an said inside projections.

8. A liner according to claim 1, wherein said fixing means includes a first engaging portion disposed on said base portion, and a plurality of second engaging portions, disposed on said base portion and angularly spaced apart from each other and from said first engaging portion,
    said first engaging portion being selectively engagable with said second engaging portions to maintain said base portion in a substantially cylindrical form when said base portion is expanded.

9. A liner according to claim 8 wherein said first and second engaging portions are selected from a group comprising: Z-like metal fittings; one edge of said base portion; a hole formed in said base portion; a tongue formed by embossing a part of said base portion from one side in a thickness direction of said base portion to an other side; a projection formed at said base portion; and a bent portion obtained by bending one end of said base portion.

10. A liner according to claim 8, wherein said base further includes a pair of belt-like extension portions, extending in mutually parallel relation at an interval in an axial direction of said base from one end of said base portion, and
    one of said first and second engaging portions including a pair of elongate notches extending in said axial direction and formed at an interval in said axial direction of said base portion at the opposite side of said extension portion, each notch capable of receiving said extension portion, and the other of said first and second engaging portions including a saw-like tooth formed on said extension portion engagable with said notch.

11. A liner according to claim 1, wherein said base further includes a deformation portion deformed outward in a radial direction of said base portion and formed at respective edges of said base portion in an axial direction.

12. A liner according to claim 11, wherein each deformation portion successively extends from one end of said base portion to a other end of said base portion.

13. A liner according to claim 12, wherein said sleeve is disposed around said base portion and between said deformation portions.

14. A liner according to claim 12, wherein said fixing means includes a first engaging portion formed at said one end, and a plurality of second engaging portions formed at said other end capable of engaging with said first engaging portion.

15. A liner according to claim 1, wherein said base has an identification code marked on an inner portion of said base.

16. A liner for repairing a pipeline placed on an inner surface of a pipe defining said pipeline, comprising:
an elastically deformable sleeve having impermeability;
a base disposed inside said sleeve in a radially expandable, wound cylindrical form; and
fixing means disposed on said base for maintaining said base portion in a substantially cylindrical form when said base is expanded radially within said sleeve;
said base including a sheet-like base portion, having one end and an other end and expandably wound in a cylindrical form so that said one end is located inside said other end, and a deformation portion, disposed at respective edges of said base portion in an axial direction, successively extending from said one end to said other end, and deformed outward in an radial direction of said base portion;
said fixing means including a first engaging portion disposed on said base and a plurality of second engaging portions angularly spaced apart from each other and from said first engaging portion on said base;
said first engaging portion being selectively engagable with said second engaging portions for maintaining said base in a substantially cylindrical form when said base portion is expanded;
said sleeve having a plurality of elastically deformable projections successively extending in the circumferential direction and formed at the outer peripheral surface of respective ends of the sleeve in an axial direction; and
said sleeve being disposed around said base portion and between said deformation portions.

17. A method for repairing a pipeline comprising the steps of:
disposing, at a predetermined portion in a pipe defining said pipeline, a liner including an elastically deformable sleeve having a smaller outer diameter than the inner diameter of said pipe and impermeability, a base having a sheet-like base portion disposed inside said sleeve in a spirally wound condition, radially expandable and having an axial length substantially equal to that of said sleeve, and fixing means disposed on said base for maintaining said base portion in a substantially cylindrical form when said base portion is expanded radially inside said sleeve;
expanding said base portion radially to elastically deform said sleeve by pressing said sleeve against said pipe; and
maintaining said base portion by said fixing means in a radially expanded condition to maintain said sleeve in an elastically deformed condition.

18. A method according to claim 17, further comprising the step of forming an annular recess for receiving said liner at a predetermined portion within said pipe prior to disposition of said liner at the predetermined portion within said pipe.

19. A method according to claim 17, wherein said base has an identification code marked on an inner portion of said base.

* * * * *